US012023679B2

United States Patent
Nissen et al.

(10) Patent No.: US 12,023,679 B2
(45) Date of Patent: Jul. 2, 2024

(54) LABWARE ALIGNING SYSTEMS AND LIQUID HANDLING SYSTEMS AND METHODS INCLUDING SAME

(71) Applicant: PerkinElmer Cellular Technologies Germany, GmbH, Hamburg (DE)

(72) Inventors: Nils Nissen, Wedel (DE); Guido Harmsen, Wedel (DE); Christoph Klaunick, Hamburg (DE)

(73) Assignee: Revvity Cellular Technologies GmbH, Hamburg (DE)

( * ) Notice: Subject to any disclaimer, the term of this patent is extended or adjusted under 35 U.S.C. 154(b) by 492 days.

(21) Appl. No.: 17/147,356

(22) Filed: Jan. 12, 2021

(65) Prior Publication Data

US 2021/0220833 A1    Jul. 22, 2021

Related U.S. Application Data

(60) Provisional application No. 62/964,441, filed on Jan. 22, 2020, provisional application No. 62/962,357, filed on Jan. 17, 2020.

(51) Int. Cl.
  *B01L 9/00*   (2006.01)
  *B01L 3/00*   (2006.01)

(52) U.S. Cl.
  CPC ............... *B01L 9/54* (2013.01); *B01L 3/5085* (2013.01); *B01L 2200/025* (2013.01); *B01L 2300/0829* (2013.01)

(58) Field of Classification Search
  CPC .... B01L 3/5085; B01L 9/54; B01L 2200/025; B01L 2300/0829
  See application file for complete search history.

(56) References Cited

U.S. PATENT DOCUMENTS 8,614,789 B2    12/2013    Noblett et al.
2004/0096368 A1   5/2004    Davis et al.
(Continued)

FOREIGN PATENT DOCUMENTS

CN    204116251 U       1/2015
CN    204116351 U  *    1/2015
CN    204116351 U       1/2015

OTHER PUBLICATIONS

"Descriptions of Scanning Stages of Opera Phenix and Operetta CLS" (See remarks accompanying this Information Disclosure Statement).
(Continued)

*Primary Examiner* — Matthew D Krcha
*Assistant Examiner* — Austin Q Le
(74) *Attorney, Agent, or Firm* — Myers Bigel, P.A.

(57) ABSTRACT

A labware aligning system for use with a labware includes a frame and fixation system. The frame includes a seat. The fixation system includes a pusher and a pusher actuator. The pusher is movable relative to the frame between an open position and a closed position. The pusher actuator includes an actuator linkage and a biasing mechanism. The actuator linkage is configured to: move the pusher from the closed position toward the open position when the actuator linkage is displaced; and, permit the pusher to move toward the closed position when the actuator linkage is not displaced. The biasing mechanism is operative to force the pusher toward the closed position when the actuator linkage is not displaced and to thereby cause the pusher to align the labware in the seat.

22 Claims, 13 Drawing Sheets

(56) References Cited

U.S. PATENT DOCUMENTS

| | | |
|---|---|---|
| 2005/0118060 A1 | 6/2005 | Evans |
| 2014/0116159 A1* | 5/2014 | Zimmerman .......... G01N 30/18 |
| | | 73/863.01 |
| 2014/0305229 A1 | 10/2014 | Brady et al. |
| 2019/0107547 A1* | 4/2019 | VanSickler ............... B01L 9/54 |
| 2020/0110033 A1* | 4/2020 | Nakagawa ............. G01N 21/01 |

OTHER PUBLICATIONS

Opera Phenix Application Guide, 3rd Edition, PerkinElmer (180 pages) (Jul. 2017).
Opera Phenix User Manual, PerkinElmer (672 pages) (May 16, 2018).
Operetta CLS Application Guide, 3rd Edition, PerkinElmer (180 pages) (Oct. 2018).
Operetta CLS User Manual, PerkinElmer (688 pages) (Mar. 13, 2019).
Notification of Transmittal of the International Search Report and the Written Opinion of the International Searching Authority, or the Declaration, in corresponding PCT Application No. PCT/EP2021/050740 (May 11, 2021).
Notification of Transmittal of the International Search Report and the Written Opinion of the International Searching Authority, or the Declaration, in corresponding PCT Application No. PCT/EP2021/050740 (Apr. 14, 2021).

\* cited by examiner

LABWARE ALIGNING SYSTEMS AND LIQUID HANDLING SYSTEMS AND METHODS INCLUDING SAME

RELATED APPLICATIONS

The present application claims the benefit of and priority from U.S. Provisional Patent Application No. 62/962,357, filed Jan. 17, 2020, and U.S. Provisional Patent Application No. 62/964,441, filed Jan. 22, 2020, the disclosures of which are incorporated herein by reference in their entireties.

FIELD

The present technology relates to labware and, more particularly, to the apparatus and methods for handling labware.

BACKGROUND

Laboratory liquid handling systems are used to transport and operate on volumes of liquid. One or more liquid samples may be provided in a labware container (e.g., microwell plate or sample tube holder) in a liquid handling system. The liquid handling system may include one or more pipettors that are used to remove (e.g., by aspirating) portions of the samples from the labware and/or to add (e.g., by dispensing) material to the samples in the labware. In some cases, it may be desirable or necessary to move labware or tools within the system. It may be desirable or necessary to move and place the labware robotically and/or to execute a procedure on the labware robotically and, in some cases, automatically and programmatically. It may also be desirable or necessary to mount pipette tips on the pipettors and/or remove pipette tips from the pipettors.

SUMMARY

According to some embodiments, a labware aligning system for use with a labware comprises a frame and a fixation system. The frame comprises a seat. The fixation system comprises a pusher and a pusher actuator. The pusher is movable relative to the frame between an open position and a closed position. The pusher actuator comprises an actuator linkage and a biasing mechanism. The actuator linkage is configured to: move the pusher from the closed position toward the open position when the actuator linkage is displaced; and, permit the pusher to move toward the closed position when the actuator linkage is not displaced. The biasing mechanism is operative to force the pusher toward the closed position when the actuator linkage is not displaced and to thereby cause the pusher to align the labware in the seat.

In some embodiments, the biasing mechanism comprises a spring.

In some embodiments, the frame comprises a barrier adjacent the seat and opposing the pusher and, when the labware is positioned in the seat and the actuator linkage permits the pusher to move from the open position toward the closed position, the biasing mechanism forces the pusher to push the labware against the barrier.

According to some embodiments, when the labware is positioned in the seat and the actuator linkage permits the pusher to move from the open position toward the closed position, the pusher displaces the labware into an alignment with the seat.

In some embodiments, the pusher comprises a sloped bearing surface facing laterally inward toward the seat and upwardly away from the seat.

According to some embodiments, the actuator linkage comprises an engagement member that is configured to be displaced by an operator to displace the actuator linkage to move the pusher from the closed position toward the open position.

In some embodiments, the actuator linkage is configured to permit the pusher to move from the open position toward the closed position when the operator releases the engagement member.

In some embodiments, the engagement member is mechanically linked to the pusher.

In some embodiments, the engagement member comprises a lever member and redirects movement of the operator in a first direction to translational movement of the pusher in a second direction transverse to the first direction.

In some embodiments, the first direction is vertical and the second direction is horizontal.

According to some embodiments, the actuator linkage comprises a guide feature that constrains movement of the pusher to linear translation along a pusher travel axis.

According to some embodiments, the labware aligning system further comprises a detector system operative to determine a position of the pusher.

In some embodiments, the detector system comprises a photoemitter to generate a light beam, and a photodetector configured to receive the light beam. The pusher prevents the light beam from reaching the photodetector when the pusher is in the closed position. The pusher permits the light beam to reach the photodetector when the pusher is displaced by the labware in the seat.

According to some embodiments, the labware is at least one of a tip box, pipette tip box, a well plate, a microwell plate, and a rack configured to hold a plurality of fluid receptacles.

Also disclosed are methods, including a method for aligning a labware that comprises providing a labware aligning system comprising a frame and a fixation system. The frame comprises a seat. The fixation system comprises a pusher and a pusher actuator. The pusher is movable relative to the frame between an open position and a closed position. The pusher actuator comprises: a biasing mechanism operative to force the pusher from the open position toward the closed position; and, an actuator linkage. The method further comprises: mechanically displacing the actuator linkage, thereby causing the actuator linkage to move the pusher from the closed position toward the open position; positioning the labware in the seat with the pusher in the open position; and, releasing the actuator linkage to permit the biasing mechanism to force the pusher to move toward the closed position, and to thereby cause the pusher to align the labware in the seat.

According to some embodiments, the method further comprises providing a transport system operable to move the labware, the transport system comprising a carrier configured to releasably hold the labware; mechanically displacing the actuator linkage comprises displacing the engagement member with the carrier; the method further comprises removing the carrier from the labware; and releasing the actuator linkage comprises withdrawing the carrier from the actuator linkage.

According to some embodiments, a liquid handling system for use with a labware comprises an aligning system and a liquid handler. The aligning system comprises a frame and a fixation system. The frame comprises a seat. The fixation system comprises a pusher and a pusher actuator. The pusher is movable relative to the frame between an open position and a closed position. The pusher actuator comprises an actuator linkage and a biasing mechanism. The actuator linkage is configured to: move the pusher from the closed position toward the open position when the actuator linkage is displaced; and permit the pusher to move toward the closed position when the linkage is not displaced. The biasing mechanism is operative to force the pusher toward the closed position when the actuator linkage is not displaced and to thereby cause the pusher to align the labware in the seat.

In some embodiments, the liquid handling system further comprises a transport system operable to move the labware, wherein: the transport system comprises a carrier configured to releasably hold the labware; and the transport system is configured to displace the actuator linkage to move the pusher from the closed position toward the open position and to place the labware in the seat.

According to some embodiments, a labware handling system for use with a labware comprises a transport system and an aligning system. The transport system is operable to move the labware. The transport system comprises a carrier configured to releasably hold the labware. The aligning system comprises a frame and a fixation system. The frame comprises a seat. The fixation system comprises a pusher and a pusher actuator. The pusher is movable relative to the frame between an open position and a closed position. The pusher actuator comprises an actuator linkage and a biasing mechanism. The actuator linkage is configured to: move the pusher from the closed position toward the open position when the actuator linkage is displaced by the carrier; and, permit the pusher to move toward the closed position when the actuator linkage is not displaced. The biasing mechanism is operative to force the pusher toward the closed position when the actuator linkage is not displaced and to thereby cause the pusher to align the labware in the seat.

According to some embodiments, the actuator linkage comprises an engagement member that is displaced by the carrier when the carrier moves toward the seat to deposit the labware in the seat.

In some embodiments, the actuator linkage is configured to permit the pusher to move from the open position toward the closed position when the carrier moves away from and releases the engagement member.

In some embodiments, the engagement member is mechanically linked to the pusher.

In some embodiments, the engagement member comprises a lever member that redirects movement of the carrier in a first direction to translational movement of the pusher in a second direction transverse to the first direction.

In some embodiments, the first direction is vertical, and the second direction is horizontal.

According to some embodiments, the carrier comprises a gripper configured to hold the labware.

In some embodiments, the carrier comprises a carrier arm, a support feature extending from the carrier arm, and a carrier actuator; the support feature is configured to engage the labware to support the labware; and the carrier actuator is operable to disengage the support feature from the labware to release the labware from the carrier and into the seat.

According to some embodiments, the transport system comprises a robot arm and the carrier is an end effector on the robot arm.

According to some embodiments, the labware handling system further comprises a controller configured to automatically and programmatically operate the transport system to deposit the labware in the seat and remove the labware from the seat.

BRIEF DESCRIPTION OF THE DRAWINGS

The accompanying drawings, which form a part of the specification, illustrate embodiments of the technology.

DETAILED DESCRIPTION

Figure 1:
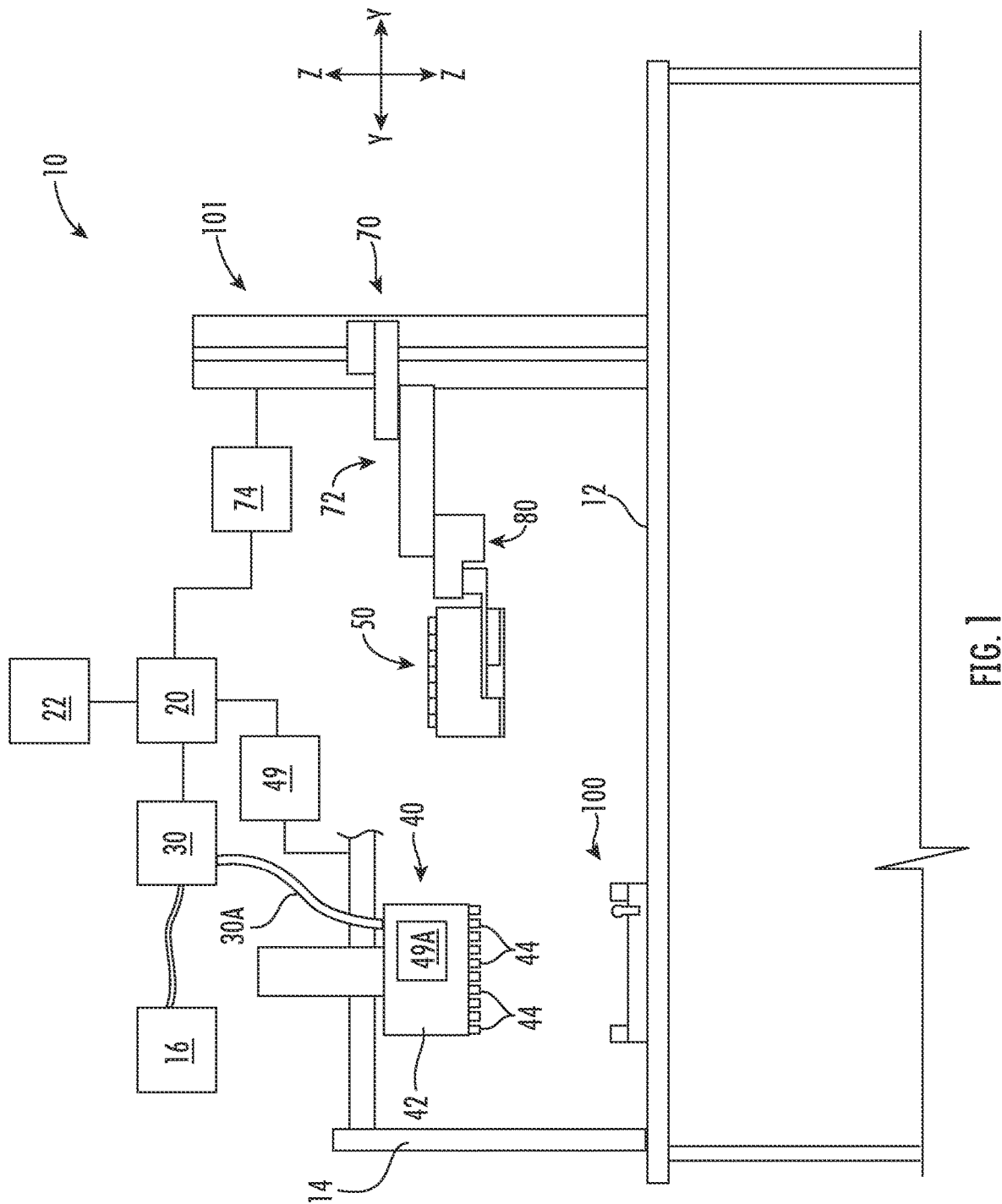
FIG. 1 is a front view of an illustrative laboratory liquid handling system including a labware handling system.

The present technology now will be described more fully hereinafter with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

With reference to FIG. 1, an example labware handling system 101 according to certain embodiments of the present technology is shown. The illustrated labware handling system 101 forms a part of a liquid handling system 10 (FIG. 1) according to the illustrated embodiments of the present technology, however it shall be understood that the disclosed methods, systems, and apparatus are not limited to liquid handling systems and/or applications, and the present disclosure is applicable to other systems and applications where it is desired to align labware. For the FIG. 1 embodiment, the labware handling system 101 transports and positions a labware 50 within the system 10.

As discussed in more detail below, the example illustrated labware handling system 101 includes a labware transport system 70 and a labware aligning system or labware holder 100 (hereinafter, referred to as the labware holder 100). In some embodiments, the labware transport system 70 transports the labware 50 and places the labware 50 in the labware holder 100. In other embodiments or uses, the labware transport system 70 is not provided or is not used to transport the labware 50 and/or install the labware 50 in the labware holder 100.

With reference to FIG. 1, the illustrated system 10 includes a platform or deck 12, a frame 14, a controller 20, an analytical instrument 16, a liquid handler 30, a pipetting module 40, and a pipetting module positioner 49.

Figure 6:
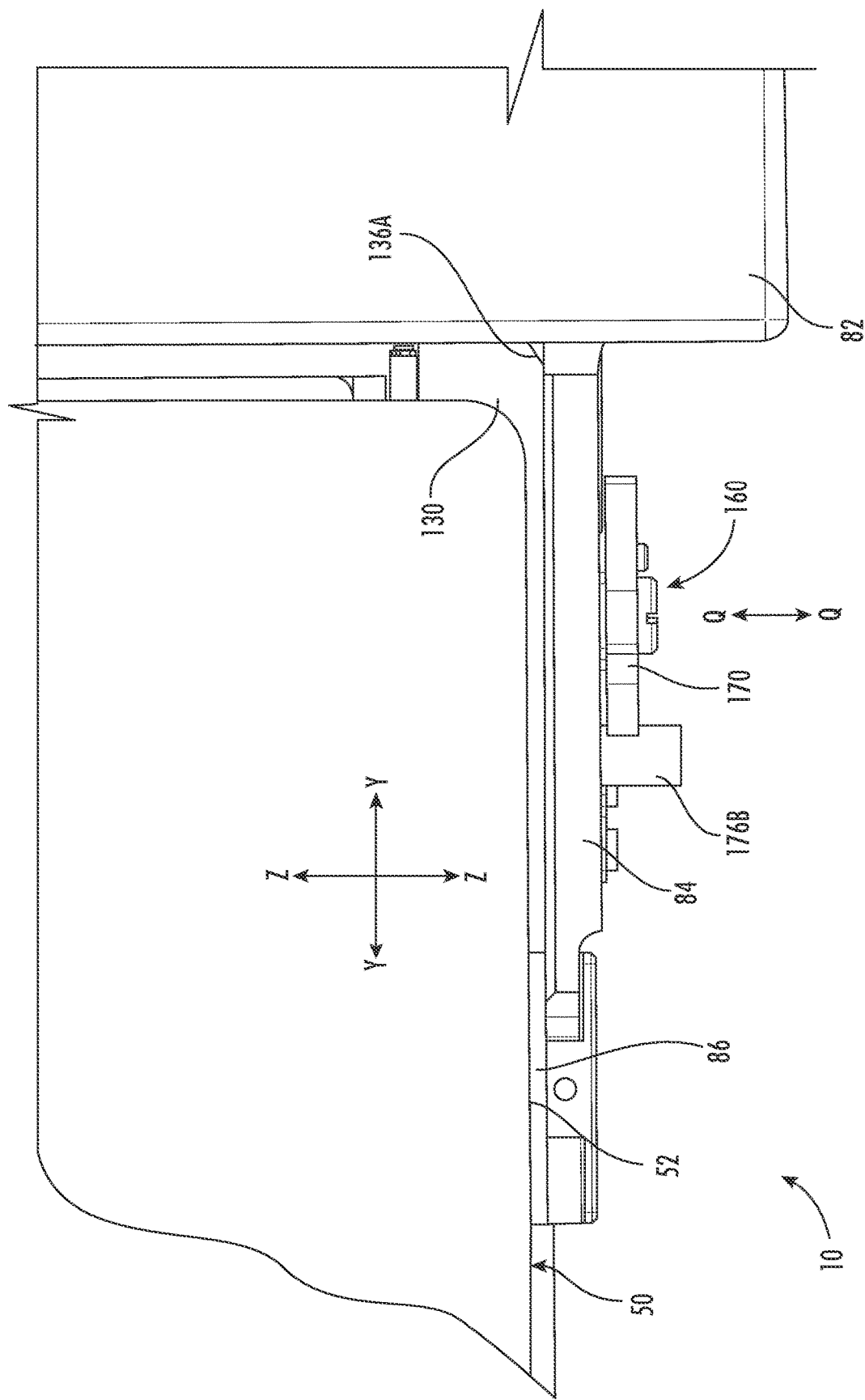
FIG. 6 is a fragmentary, top view of the labware handling system of FIG. 1, wherein a pusher is in an open position.

For the purpose of discussion and as indicated in FIGS. 1 and 6, the workspace defines a Z-axis corresponding to vertical, and orthogonal X- and Y-axes that together define a horizontal plane.

In the illustrated embodiments, the labware 50 is a container that is transportable in a work area (relative to the deck 12), although the present disclosure is not limited to a type of labware. The illustrated labware includes a tray, rack, carrier or platter 52 (FIG. 3) and a plurality of target units or objects 60 (FIG. 3) mounted in the platter 52. In some embodiments such as the illustrated embodiments, the objects 60 are pipette tips.

However, the labware may take other forms in accordance with embodiments of the technology. In some embodiments, the labware 50 is a container that is configured to hold one or more liquid samples to be operated on by the system 10. The labware 50 may include a plurality of receptacles each configured to hold a respective liquid sample. The receptacles may be individual vials or other vessels removably seated in the platter 52 in place of the pipette tips 60. By way of further example, the labware 50 may be or include a well plate or microwell plate including integral recesses or receptacles to directly contain liquid samples. However, it will be understood that the disclosed methods, systems and apparatus are not limited to use with labware that holds objects (e.g., pipette tips) or liquid samples.

The labware 50 may be or include a platter or rack of another configuration that holds pipette tips, vials or other suitable types of liquid containers or vessels.

Figure 3:
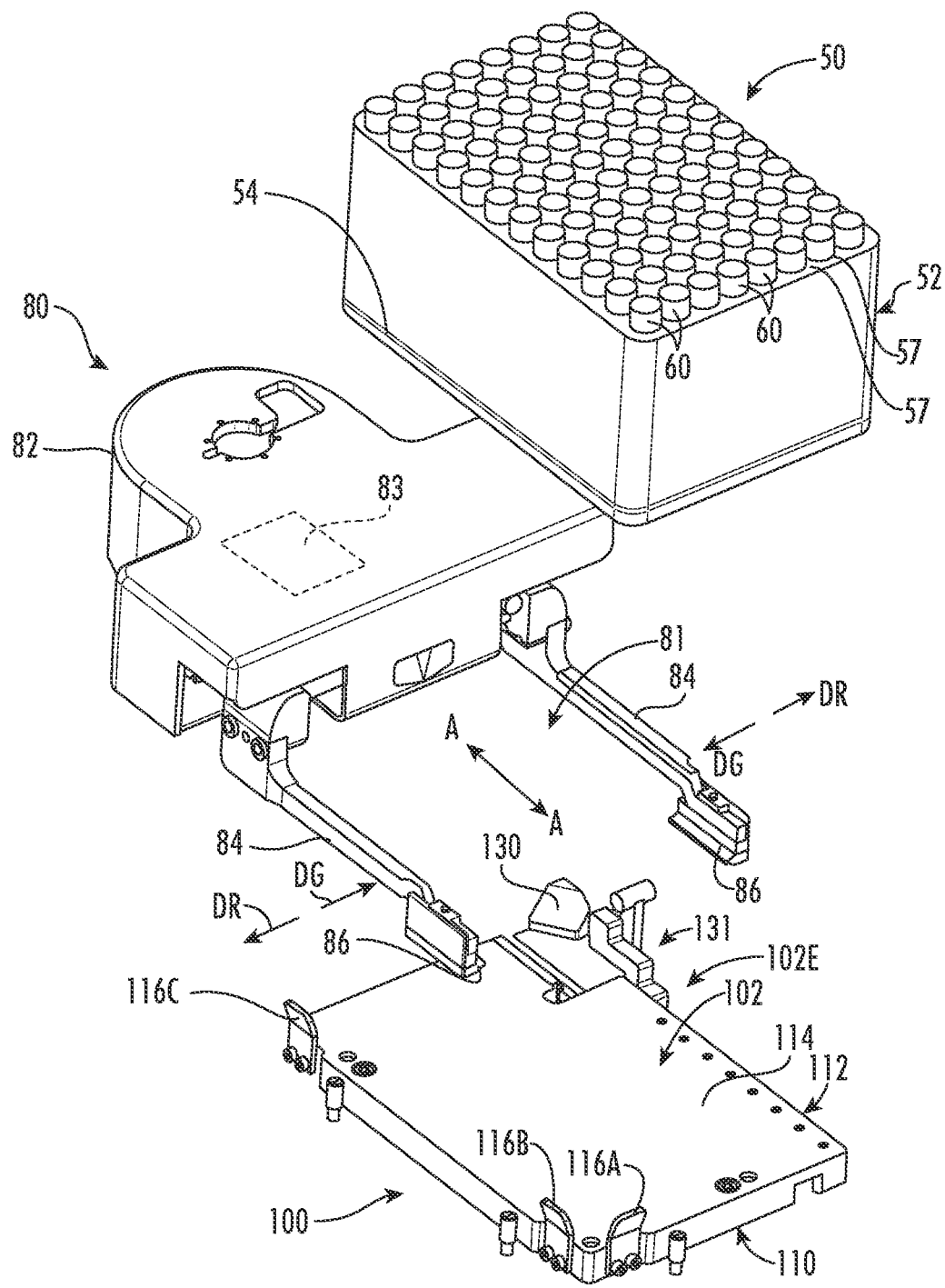
FIG. 3 is a fragmentary, exploded, top, front perspective view of a labware handling system according to FIG. 1.

The illustrated platter 52 of FIG. 3 includes carrier engagement features in the form of grooves 54 extending horizontally along either side of the platter 52. The illustrated platter 52 also includes a plurality of receptacles or slots 57, each accessible from the top side of the platter 52. In such a system, the pipette tips 60 may each be mounted in a respective one of the slots 57. In some embodiments, the slots 57 are arranged in a prescribed X-Y array. For example, the illustrated platter 52 includes an 8 by 12 array of the slots 57 (for 96 slots total).

For an embodiment of the disclosure according to FIG. 1, a liquid handler 30 may be understood to be any apparatus that can aspirate and/or dispense a desired amount of a liquid from or into a container. Example liquid handlers 30 may include, for example, a syringe or pump fluidly connected to the pipetting module 40 by one or more lengths of tubing 30A. The illustrated liquid handler 30 may be controlled by the controller 20.

The illustrated pipetting module 40 may include a housing or base 42 and a plurality of pipettors 44 mounted on the base 42. The pipettors 44 may be arranged in a single row or in a prescribed X-Y array, for example.

A pipetting module positioner 49 may be provided in such an embodiment to move the pipetting module 40 about the deck 12. The pipetting module 40 may include one or more pipettor actuators 49A to selectively lower and raise (extend and retract) the pipettors 44 with respect to the base 42 and/or to raise and lower the base 42 with respect to the deck 12. The pipetting module positioning system 49 and the actuator(s) 49A may be controlled by the controller 20.

Figure 11:
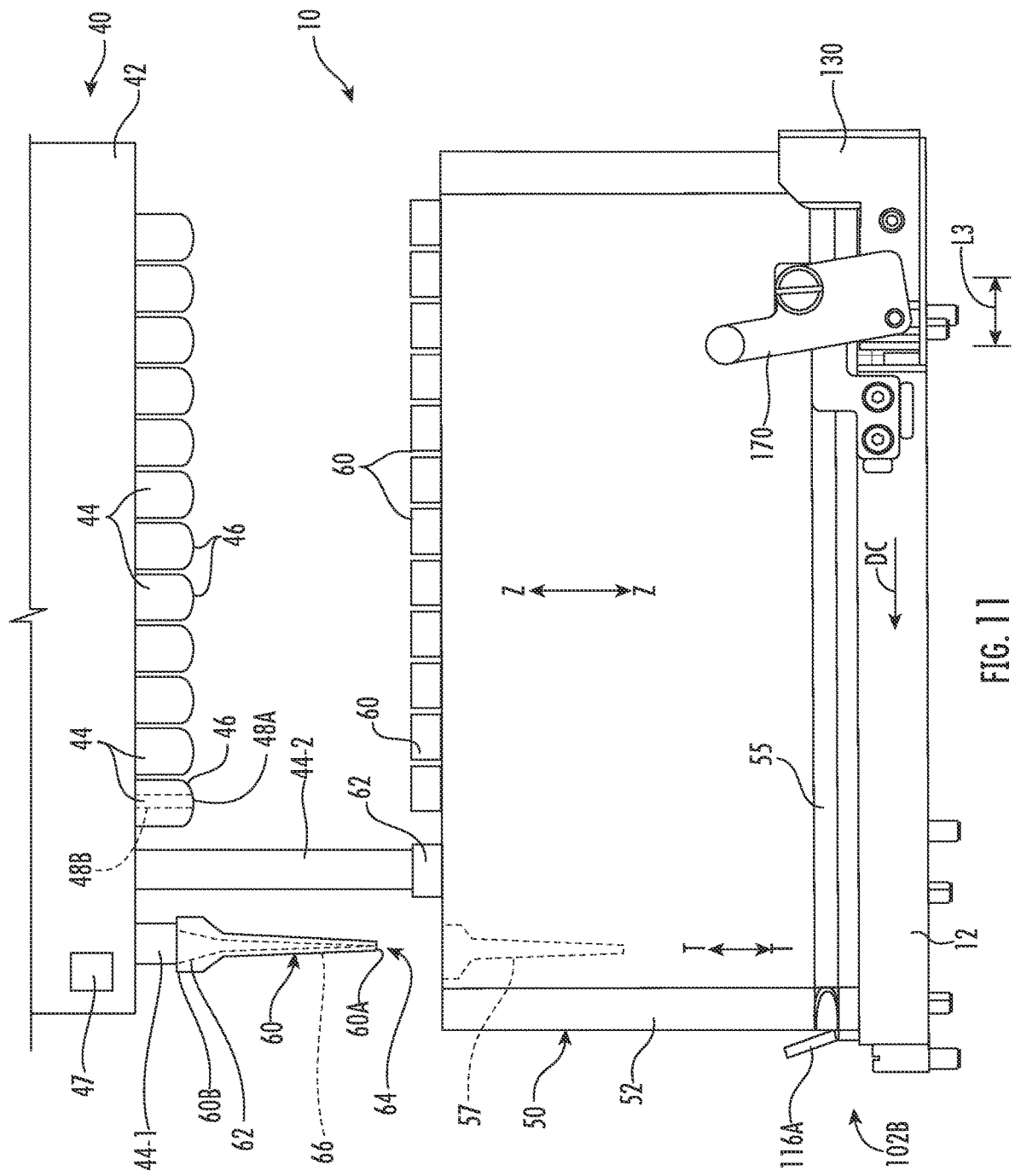
FIG. 11 is a fragmentary, side view of a laboratory liquid handling system according to FIG. 1, wherein labware is seated in a labware holder, a pusher is in a fixing position and a pipette tip has been removed from the labware.

With reference to FIG. 11, and with continued reference to the illustrative embodiment of FIG. 1, each pipettor 44 may be understood to have a lengthwise axis T-T and a distal end portion 46. Similarly, each pipettor 44 may be understood to include an axially extending passage 48B that terminates at an opening 48A at its distal end portion 46. In use in accordance with a system according to FIG. 1, each pipettor 44 can be raised and lowered along its lengthwise axis T-T by the pipettor actuator(s) 49A. In some embodiments, the axis T-T is substantially parallel to the vertical axis Z-Z. In some embodiments, one or more of the pipettors 44 are fluidly connected to the liquid handler 30 by the tubing 30A.

Each pipettor 44 may also include a pipette tip ejector mechanism 47 (schematically illustrated in FIG. 11).

With continued reference to FIG. 11, each illustrated pipette tip 60 is tubular and has a distal end 60A and an opposing proximal end 60B. Each pipette tip 60 includes a through passage 66 that extends fully through the pipette tip 60 and terminates at a terminal opening 64 at its distal end 60A. Each pipette tip 60 also includes a coupling base 62 on its proximal end 60B. Each pipette tip 60 is seated in a respective one of the slots 57 such that its coupling base 62 faces upward.

The distal end portions 46 of the pipettors 44 and the coupling bases 62 are cooperatively adapted or configured to releasably or detachably secure each pipette tip 60 to a respective distal end portion 46. In some embodiments, the pipettors 44 and the pipette tip coupling bases 62 are configured such that, when a distal end portion 46 is inserted axially into a coupling base 62, the coupling base 62 will grip (e.g., by interference fit and/or by an O-ring (e.g., elastomeric O-ring) mounted on the distal end portion 46 or on the coupling base 62) or interlock with the distal end portion 46. In some embodiments, the grip or interlock is sufficient to retain the pipette tip 60 on the end portion 46 during operations as described herein, but also permits the pipette tip 60 to be detached and removed from the end portion 46 when deliberately acted upon in a removal operation. In some embodiments, the pipette tip ejector mechanism 47 is configured to selectively and forcibly push each pipette tip 60 off of its associated pipettor 44.

With reference to FIG. 3, in some embodiments, the labware 50 is provided as a tip box or pipette tip box including the platter 52 and pipette tips 60 may be pre-installed therein by, e.g., a manufacturer.

The illustrated transport system 70 (FIG. 1) includes an articulating robotic transport arm 72, a carrier 80 (provided as an end effector on the transport arm 72), and one or more transport arm actuators 74. The transport arm actuators 74 are operable to move the carrier 80 about the deck 12, including raising and lowering the carrier 80.

In some embodiments, the carrier 80 is a robotic gripper. The illustrated carrier 80 (FIG. 3) includes a carrier base 82 and a pair of opposed carrier fingers or arms 84 mounted on the base 82. The illustrated carrier arms 84 are cantilevered from the carrier base 82 and extend along a lengthwise axis A-A. The illustrated arms 84 are spaced apart about the axis A-A to define an open space therebetween. Each arm 84 is provided with a support feature or tab 86 that projects laterally inwardly toward the opposing arm 84. In the illustrated embodiment, the support arms 84 and tabs 86 define a carrier seat 81, however such example is provided for illustration and not limitation.

The example carrier 80 further includes a carrier actuator 83 configured selectively to displace the arms 84 laterally along a lateral axis A-A toward one another (in convergent directions DG) and laterally apart (in divergent directions DR). In this way, the carrier actuator 83 can be used to place the carrier 80 in an open position (FIG. 9) wherein the arms 84 are spread apart a first distance and, alternatively, in a closed position (FIG. 6) wherein the arms 84 are laterally spread apart a second distance that is less than the first distance.

It will be appreciated from the disclosure herein that the transport system 70 and the carrier 80 may have different configurations than shown herein. For example, the transport system 70 may include a rail and gantry mechanism in place of or in addition to the transport arm 72.

The construction and functionality of the liquid handler 30, pipetting module 40, pipetting module positioner 49, and labware transport system 70 are only exemplary, and it will be appreciated that these systems and components may be otherwise constructed and operated in accordance with embodiments of the technology.

Figure 8:
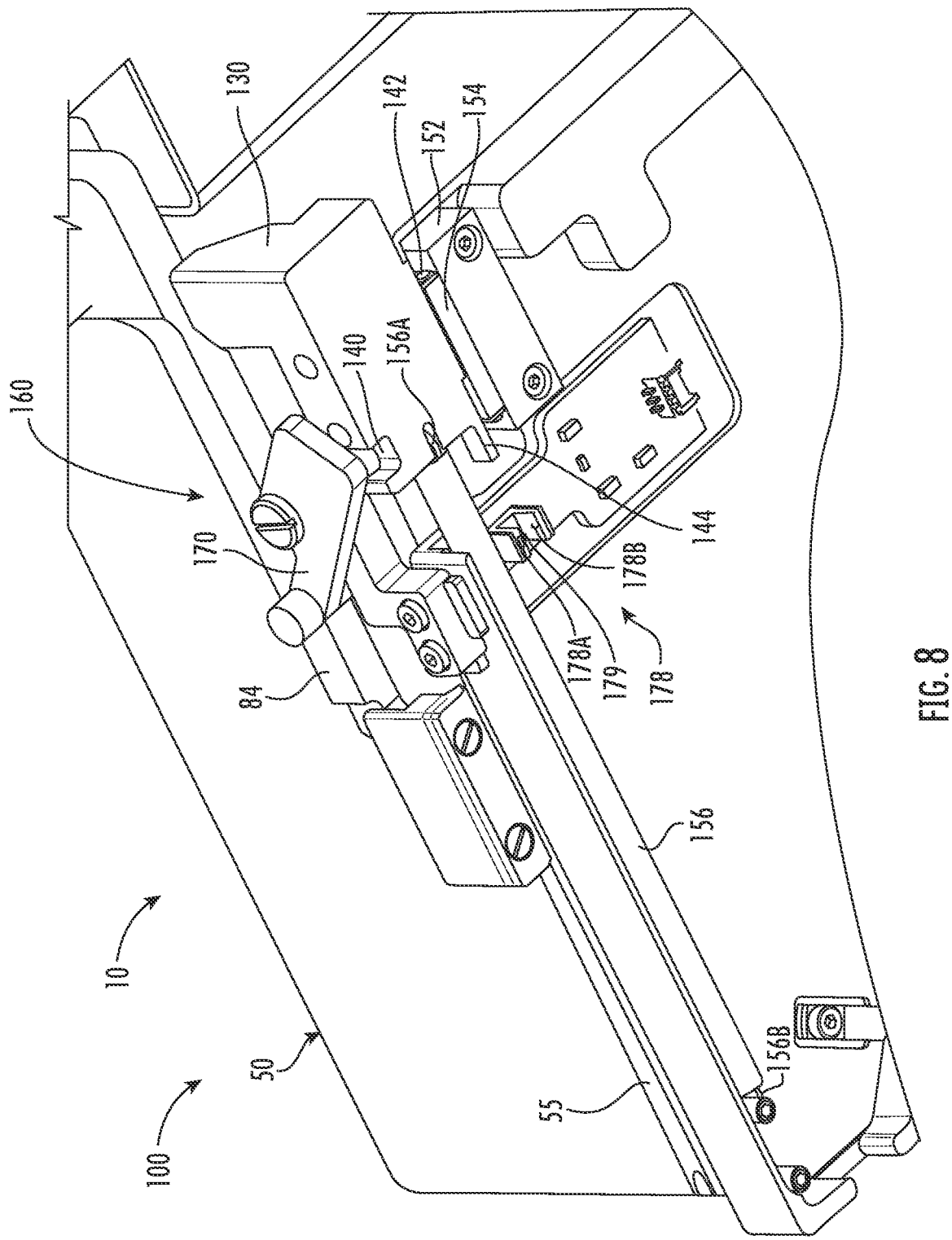
FIG. 8 is a fragmentary, bottom perspective view of a labware handling system according to FIG. 1, wherein a pusher is in an open position.

The illustrated labware holder 100 includes a frame 110 and a fixation system 131 that define a labware holder seat 102, although the present disclosure is not limited to such an embodiment. The labware holder 100 may further include a labware presence detection system 178 (FIG. 8).

The FIG. 3 frame 110 includes a frame base 112 and three rigid stops 116A, 116B, 116C.

Figure 7:
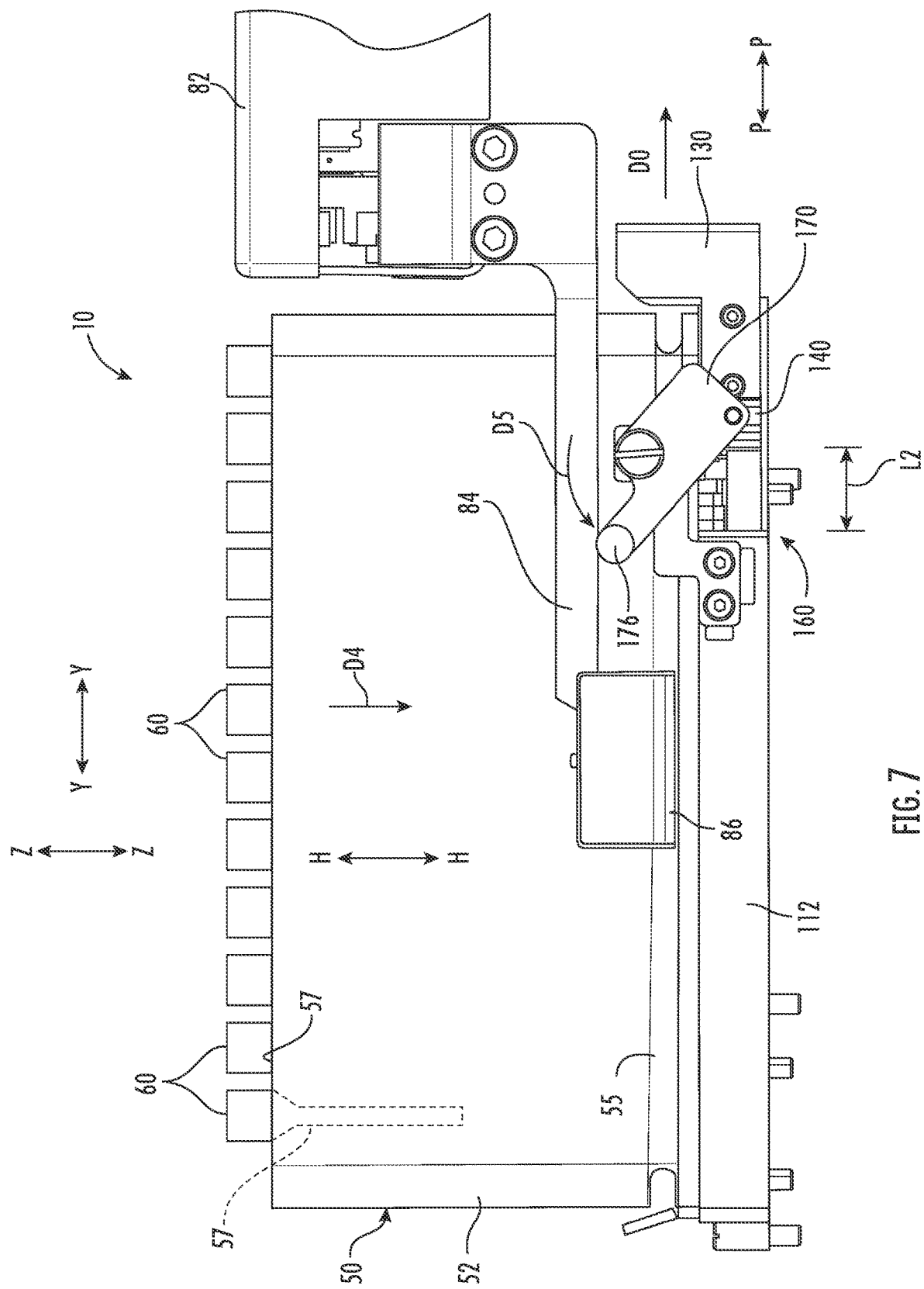
FIG. 7 is a fragmentary, side view of a labware handling system according to FIG. 1, wherein a pusher is in an open position.

The example frame 110 has a first or main axis M-M (FIG. 10), a second or lateral axis L-L, and a third or heightwise axis H-H (FIG. 7). In some embodiments, the heightwise axis H-H is substantially vertical, and the main axis M-M and the lateral axis L-L are substantially perpendicular to one another and to the heightwise axis H-H.

Returning to FIG. 10, the illustrated frame base 112 includes a planar, horizontally oriented support surface 114 (FIG. 3) bounded by a front end side 112A, an opposing rear end side 112B, a first lateral side 112C, and an opposing second lateral side 112D. A recess 118 (FIG. 4) is defined in one corner of the base 112. The support surface 114 defines a holder base plane that is substantially horizontal.

The stop 116A is located at the edge of the rear end side 112B proximate the corner between the sides 112B and 112D. In this embodiment, a stop 116B is located at the edge of the lateral side 112D proximate the corner between the sides 112B and 112D so that the stops 116A and 116B are oriented perpendicular with one another and collectively define a corner seat 117. The stop 116C is also located at the edge of the lateral side 112D and axially spaced apart from the stop 116B. The stops 116B and 116C collectively form a lateral side barrier. The stop 116A forms an end barrier. Other configurations of stops may be used, and the present disclosure is not limited to the illustrated embodiments that are provided for illustration and not limitation.

Figure 4:
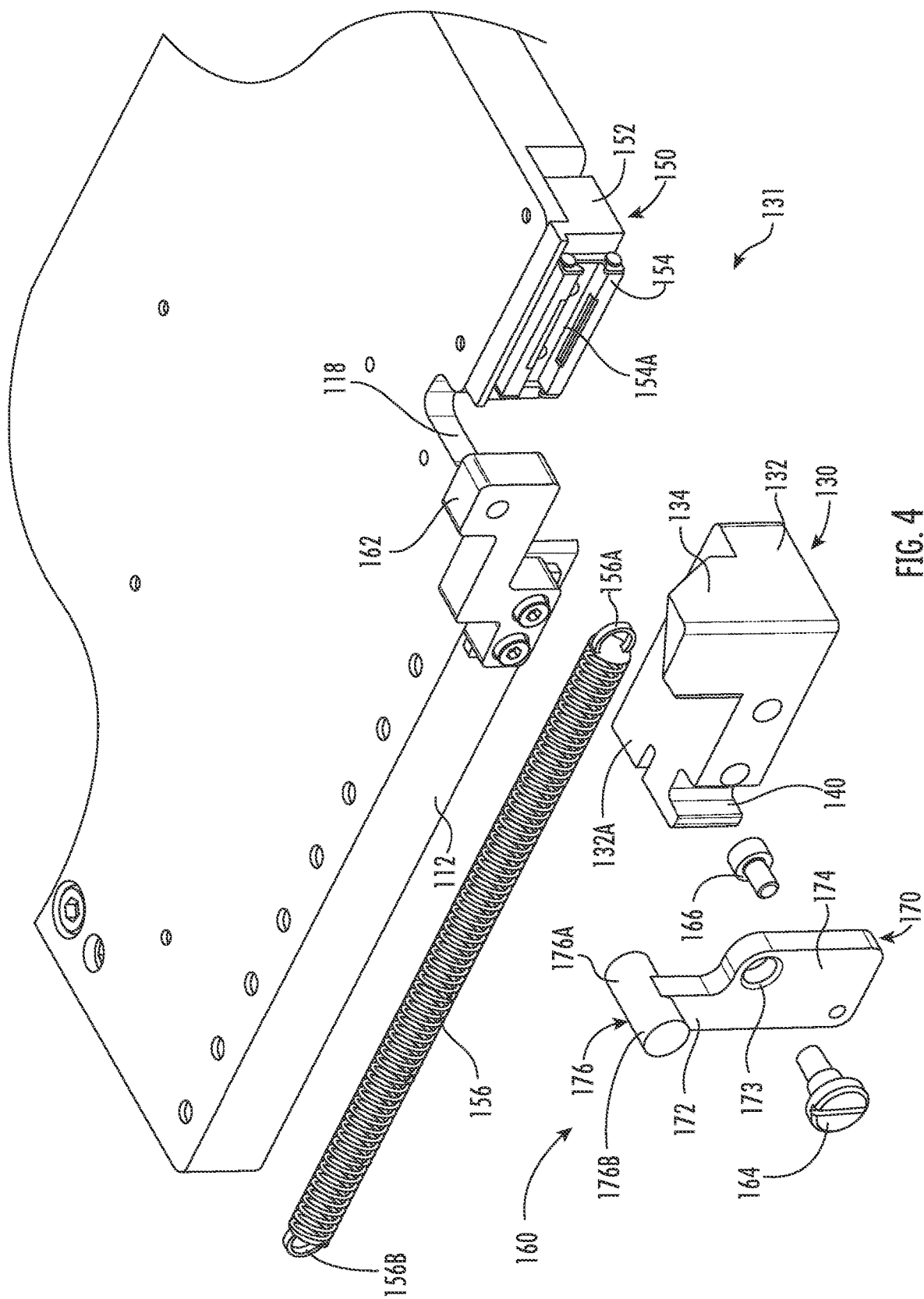
FIG. 4 is a fragmentary, exploded, top, rear perspective view of a labware holder forming a part of a labware handling system according to FIG. 1.

Referring to FIG. 4, the illustrated fixation system 131 includes a pusher 130, a mount assembly 150, a pusher actuator linkage 160, and a spring 156. The actuator linkage 160 and the spring 156 cooperatively form a pusher actuator.

For the purposes of the present disclosure, a pusher may be understood to be a mechanism that is responsible for and/or capable of urging a labware component into a seat of a frame. The illustrated pusher 130 of FIG. 4 and FIG. 5 includes a body or base 132 having a planar, horizontally oriented support surface 132A. The illustrated pusher 130 further includes an integral stop, post, or bearing feature 134 projecting upwardly from the support surface 132A and having a bearing surface 136. The bearing surface 136 (FIG. 5) includes a lower face 136A and a chamfer or sloped upper face 136B. As discussed below, the pusher 130 is slidably coupled to the base 112 to slide in an inward direction DC and an opposing outward direction DO along a substantially horizontal slide or pusher travel axis P-P. The pusher travel axis P-P is substantially parallel to the main axis M-M.

Figure 5:
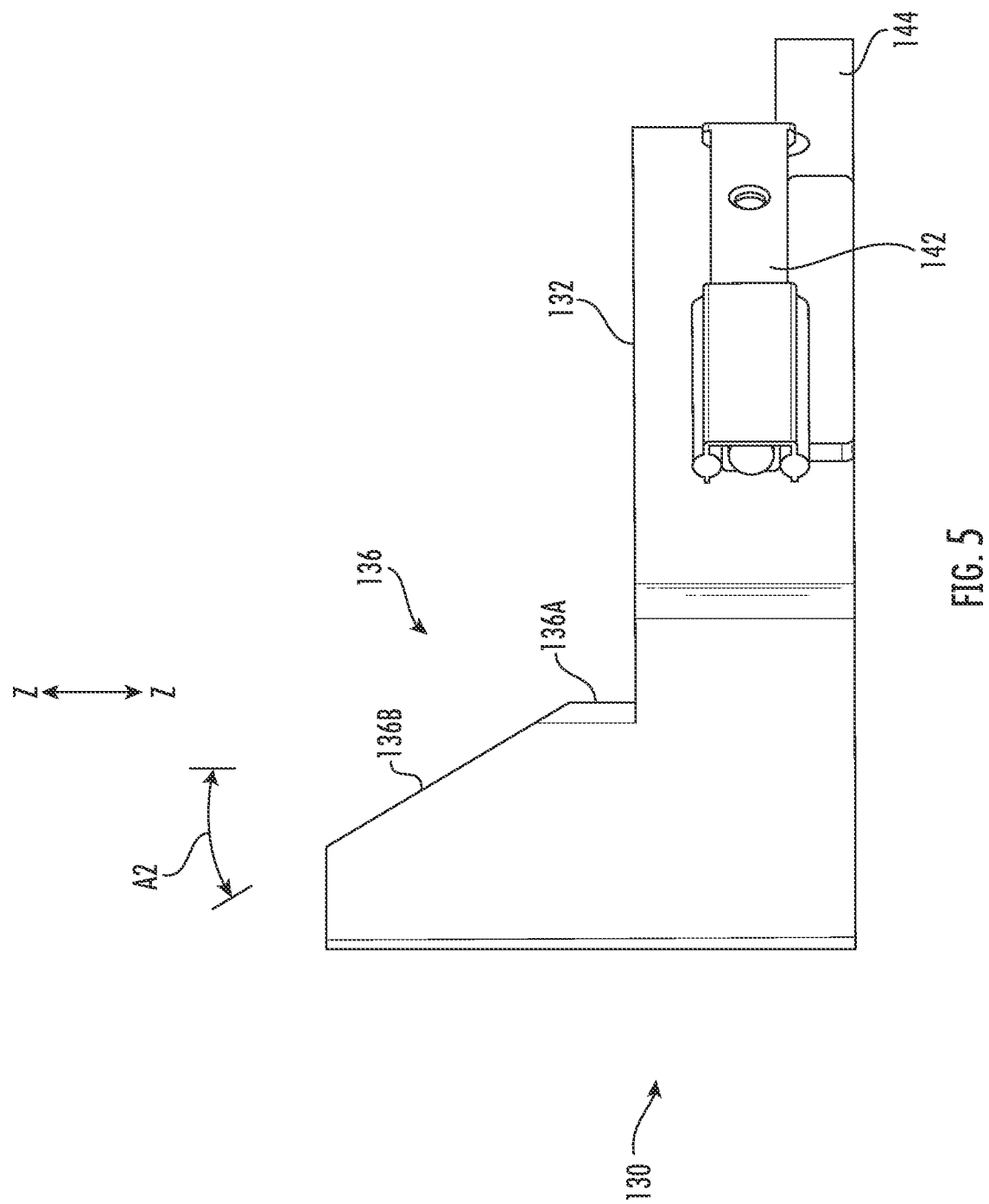
FIG. 5 is a side view of a pusher forming a part of a labware holder according to FIG. 4.

Referring to FIG. 5, the lower face 136A of the pusher 130 is substantially planar and defines a pusher lower face plane. The pusher lower face plane extends substantially parallel to vertical Z-Z (i.e., substantially perpendicular to the horizontal base plane of the support surface 114). The pusher lower face plane forms an oblique angle A1 (FIG. 10) with the pusher travel axis P-P.

The illustrated pusher 130 upper face 136B is substantially planar and defines a pusher upper face plane. The pusher upper face plane extends at an oblique angle A2 (FIG. 5) relative to vertical Z-Z. The upper face plane 136B forms an oblique angle A3 (FIG. 10) with the pusher travel axis P-P. The upper face 136B of the bearing surface 136 faces laterally inward toward the seat 102 and upwardly away from the seat 102.

It will be appreciated that the shape and construction of the pusher 130 is exemplary, and the pusher may have a different configuration in accordance with other embodiments of the technology.

A lever guide slot 140 (FIG. 4) is defined the outer lateral side of the illustrated pusher 130. The lever guide slot 140 extends substantially vertically.

An integral linear guide rail 142 (FIGS. 5, 8) extends along the inner lateral side of the pusher 130. The guide rail 142 extends along a substantially horizontal axis.

An integral detection tab 144 (FIGS. 5, 8) projects forwardly from the front end of the pusher 130.

A mount assembly 150 (FIG. 4) includes a fixation block 152 and a guide track 154. The fixation block 152 is affixed to the base 112, and the guide track 154 is in turn affixed to the fixation block 152. The guide track 154 defines a guide groove 154A in which the guide rail 142 is slidably received. The illustrated guide rail 142, and thereby the pusher 130, are thereby coupled to the base 112 to be slid along the pusher travel axis P-P. The engagement between the guide track 154 and the guide rail 142 (FIGS. 5, 8) constrains the pusher 130 to linear movement along the pusher travel axis P-P.

A spring 156 may serve as a biasing mechanism, although such is merely an example of a biasing mechanism. For the illustrated embodiment, the spring 156 may be any suitable type of spring. In some embodiments and as illustrated, the spring 156 is a wound coil spring. One end 156A of the spring 156 is anchored to the pusher 130 (e.g., by a spring pin). The opposing end 156B of the spring 156 is anchored to the base 112 (e.g., by an attachment feature or fastener).

Referring to FIGS. 4 and 6-8, a pusher actuator linkage 160 includes an engagement member or lever member 170, a lever holder 162, a pivot pin 164, and a guide pin 166. The lever member 170 includes an upper leg 172, a lower leg 174, a pivot hole 173, and an engagement feature 176. The lever holder 162 is rigidly mounted on the base 112. The lever member 170 is pivotably coupled to the lever holder 162 by the pivot pin 164 for rotation about a horizontal pivot axis Q-Q (FIG. 6). The upper leg 172 is laterally offset from the pivot axis Q-Q.

The guide pin 166 is affixed to the lower leg 174 and extends laterally inward. The guide pin 166 is slidably seated in the guide slot 140 (FIGS. 7, 8) of the pusher 130 and mechanically links the lever member 170 to the pusher 130.

The engagement feature 176 is located on the upper end of the upper leg 172. The engagement feature 176 includes an engagement surface on the top side thereof and having an inner section 176A extending toward the base 112, and an outer section 176B extending away from the base 112.

Referring now to FIG. 8, a detection system 178 includes an engagement member or photoemitter 178A and a photosensor 178B that may be spaced apart to define a slot 179 therebetween. As discussed below, when the pusher 130 is slid inward toward a closed position, the detection tab 144 is received in the slot 179 and, when the pusher 130 is slid outward toward an open position, the detection tab 144 is removed from the slot 179.

Figure 10:
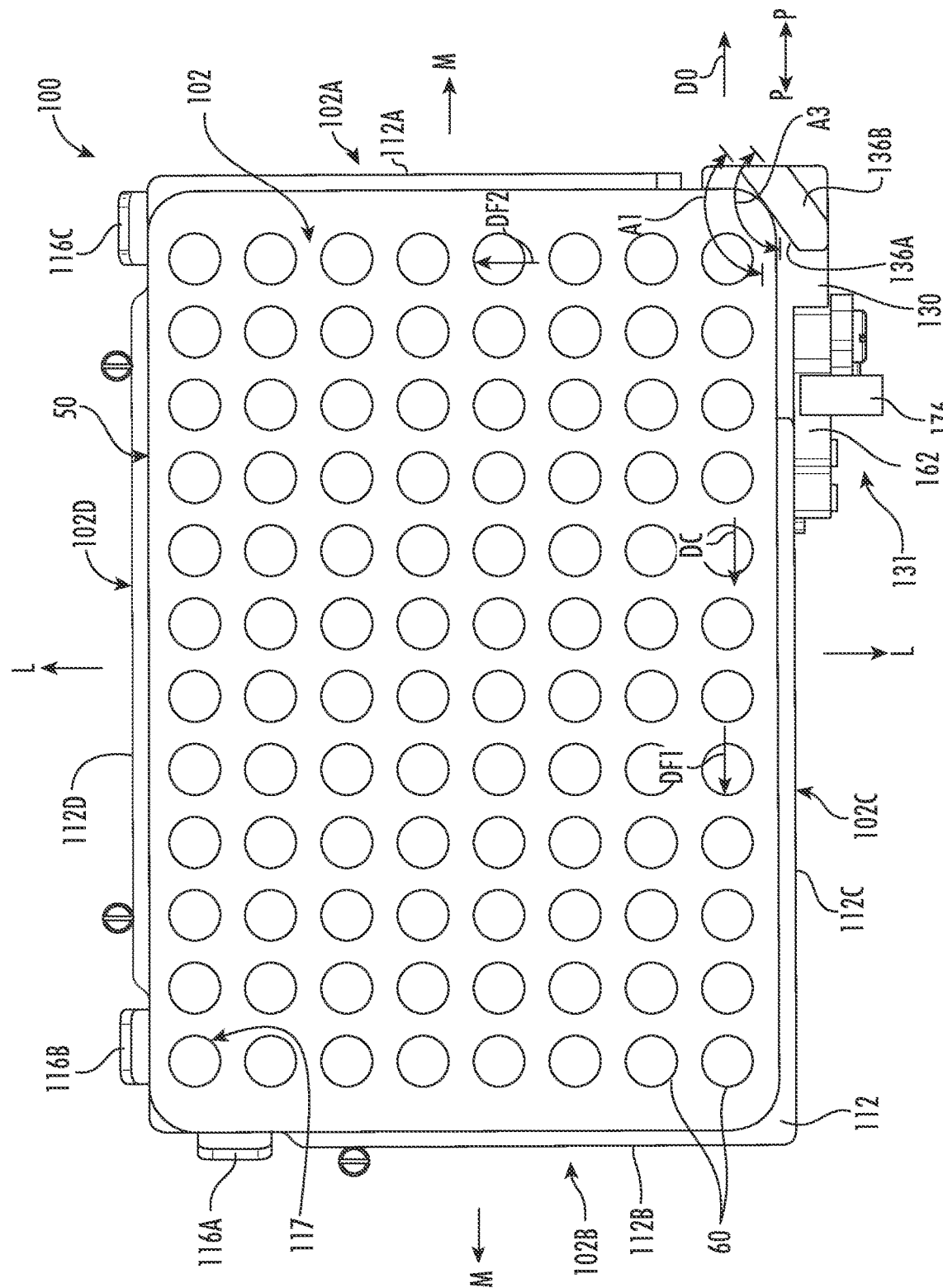
FIG. 10 is a top view of a labware holder according to FIG. 4, wherein labware is seated in the labware holder and a pusher is in a fixing position.

With reference to FIG. 10, the illustrated seat 102 is bounded by the base 112, the stops 116A-C, the lever holder 162, and the pusher 130. The seat 102 has a front end 102A proximate the base front end 112A, a rear end 102B proximate the base rear end 112B, a first lateral side 102C proximate the base side 112C, and a second lateral side 102D proximate the base lateral side 112D. The illustrated seat 102 also includes a top opening 102E (FIG. 3).

Exemplary operation of a system 10 and labware handling system 101 and use of a holder 100 in accordance with methods of the present technology will now be described with reference to FIGS. 6-11. It will be appreciated that the following procedure is exemplary and may be modified depending on the desires of the operator.

Figure 2:
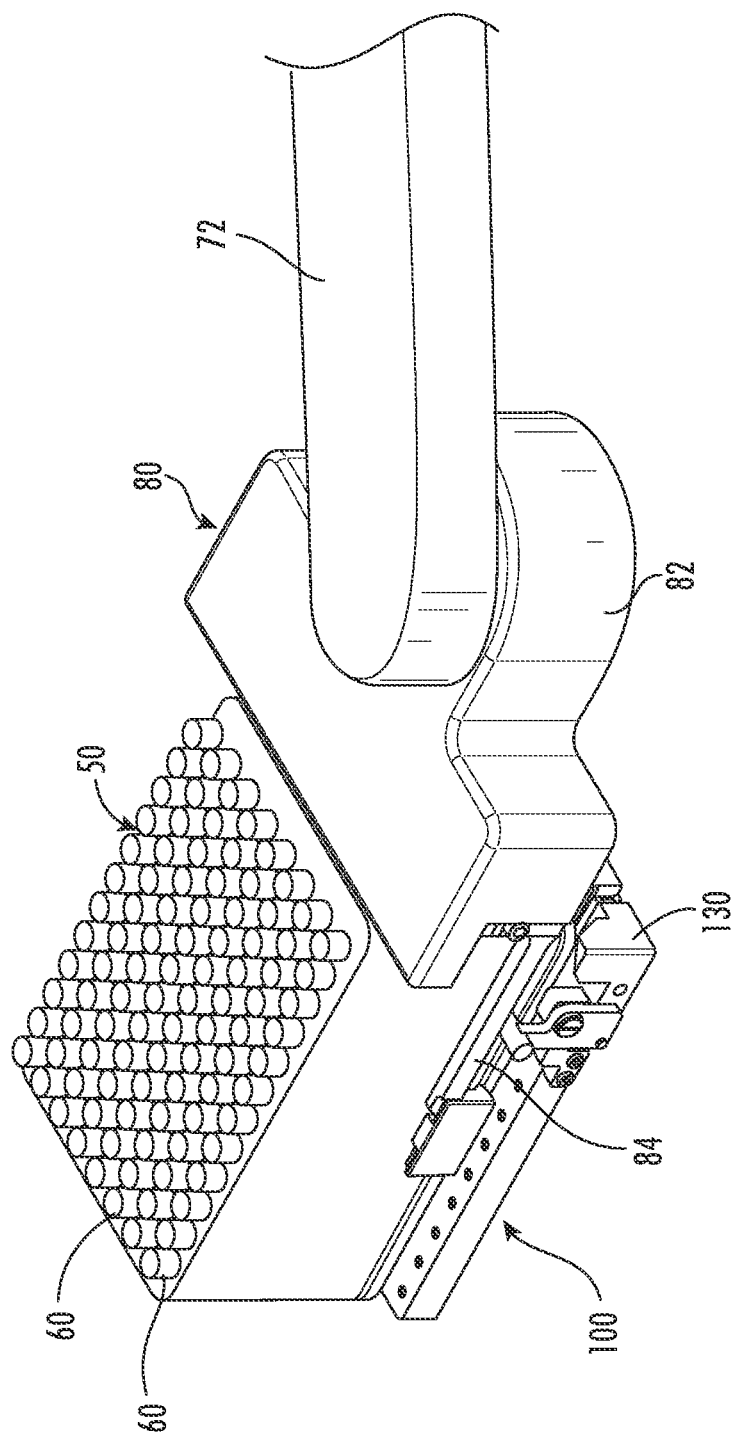
FIG. 2 is a fragmentary, top, rear perspective view of a labware handling system according to FIG. 1.

Initially, the labware holder 100 is empty and no labware is disposed in the carrier seat 81. The spring 156 retains the pusher 130 in a closed position (as shown in FIGS. 2 and 3). The front end of the pusher 130 abuts an edge of the recess 118 (FIG. 4). In some embodiments, the spring 156 is in tension (i.e., stretched from its relaxed state) when the pusher 130 is in its closed position so that the spring 156 exerts a persistent load drawing the pusher 130 in the forward direction DR.

With continued reference to FIG. 1, the labware 50 may be disposed on the deck 12 or elsewhere. For example, the labware 50 may be a tip box stacked on one or more other tip boxes in a location accessible by the transport system 70. The transport system 70 is operated to grab the labware 50, transport the labware 50 to the holder 100, deposit the labware 50 in the holder 100, and release the labware 50. These operations may be executed by the controller 20.

More particularly, and as exemplified in FIGS. 2 and 3, the arms 84 of the carrier 80 are spread apart in direction DR by the carrier actuator 83 into an open position. In the open position, the arms 84 are spaced apart a prescribed distance. In the open position, the spacing between the support tabs 86 is greater than a corresponding width of the labware 50.

As shown in FIG. 1 for the illustrated embodiment, the transport arm 72 is then driven by the transport arm actuator 74 to position the support tabs 86 in alignment with the labware grooves 55 (FIGS. 7 and 8). The carrier actuator 83 (FIG. 3) then displaces the arms 84 inwardly into a gripping position. In the gripping position, the arms 84 are spaced apart a distance that is less than the first arm spacing distance, and the support tabs 86 are received in the grooves 55. The labware 50 is thereby gripped by the carrier 80. The support tabs 86 are positioned under portions of the labware 50 so that the weight of the labware 50 is supported by the support tabs 86.

The FIG. 1 transport arm 72 is then driven by the transport arm actuator 74 to position the carrier 80 and the gripped labware 50 over the seat 102 and generally (but, typically, imprecisely) in alignment with the seat 102 (e.g., as shown in FIG. 2). For example, in some embodiments, the labware 50 is substantially centered relative to the lateral side boundaries 102A-D (FIG. 10) of the seat 102.

The transport arm 72 is then driven by the transport arm actuator 74 to lower the carrier 80 (in direction D4, FIG. 7) and the gripped labware 50 into the seat 102. As the carrier 80 is lowered, the left arm 84 contacts the inner section 176A of the FIG. 4 lever arm engagement feature 176. As the arm drive 74 further moves the carrier 80 downward, the arm 84 applies a downward vertical force to the engagement features 176. This force mechanically displaces the lever member 170 to rotate about the pivot axis Q-Q (FIG. 6) in direction D5 (FIG. 7). The rotation of the lever member 170 displaces the FIG. 4 guide pin 166 rearward (direction DO, FIG. 7) and upward so that the guide pin 166 slides upward in the guide slot 140 while pushing the pusher 130 in the rearward direction DO. The linkage 160 thereby redirects movement of the carrier arm 84 in a first direction to translational movement of the pusher 130 in a second direction transverse to the first direction. More particularly, the linkage 160 thereby redirects or converts the vertical downward translational movement of the carrier arm 84 into horizontal outward translational movement of the pusher 130. In some embodiments, the pusher travel axis P-P (FIG. 7) is substantially perpendicular to the axis of downward movement of the arm 84. The displacement of the pusher 130 stretches the spring 156 and the return force of the spring 156 maintains the lever member 170 in firm contact with the arm 84.

The illustrated FIG. 1 transport arm actuator 74 lowers the carrier 80 into the seat 102 until the pusher 130 is displaced into an open position (FIGS. 6-8) and the labware 50 rests on the support surface 114 (FIG. 3) of the base 112.

The FIG. 6 lever member 170, the arm 84, and the labware 50 are relatively configured and arranged such that contact between the labware 50 and the pusher 130 is prevented. The arm 84 (via the linkage 160, FIGS. 4 and 6-8) displaces the pusher 130 outward in advance of the labware 50 entering the volume occupied by the pusher 130 in the closed position, and holds the pusher 130 in this more open position until the labware 50 is resting on the support surface 114. That is, the linkage 170 places and maintains the pusher 130 in a position that obviates contact or interference between the pusher 130 and the labware 50 as the labware 50 is lowered into the seat 102. In the open position of the pusher 130, the spring 156 is stretched from its relaxed position.

The pusher 130 travels a distance L2 (FIG. 7) from its closed position (FIG. 2; i.e., with the lever member 170 in its upright, ready position) to its open position (FIG. 7; i.e., with the carrier arm 84 in its lowest position on the lever member 170).

Figure 9:
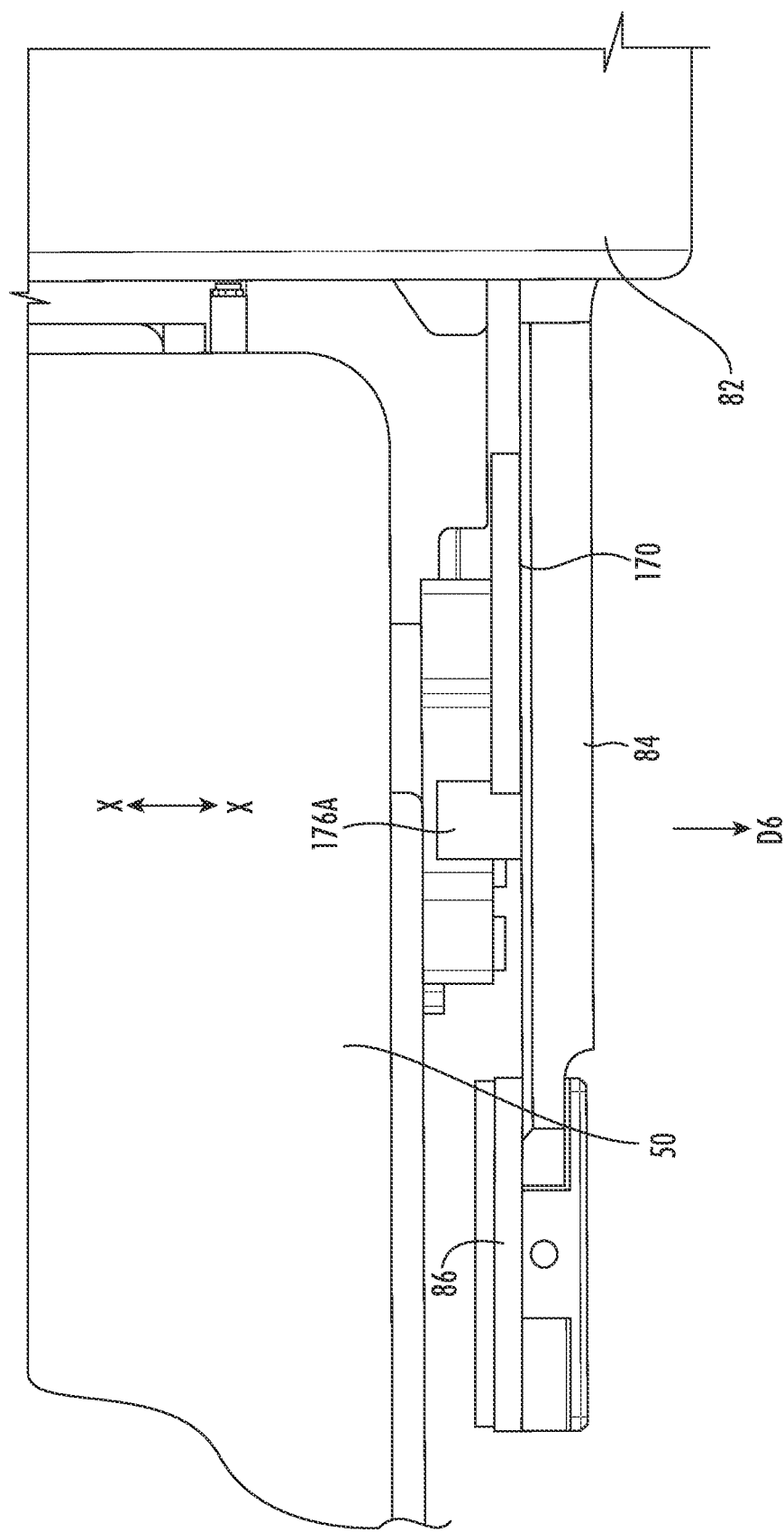
FIG. 9 is a fragmentary, top view of a labware handling system according to FIG. 1, wherein a labware is placed in a labware holder, arms of a carrier are in an open position, and a pusher is in an open position.

With the labware 50 in placed on the support surface 114 (FIG. 3), the actuator 83 moves the arms 84 back apart into the carrier open position. In doing so, the left arm 84 slides outwardly (direction D6; FIG. 9) along the lever member engagement feature 176 from the inner section 176A to the outer section 176B (FIG. 4). The support tabs 86 are thereby withdrawn from the labware grooves 55 and positioned laterally clear of the labware 50. The vertical position of the left arm 84 remains the same during this transition so that the position of the lever member 170 is not changed and the pusher 130 is thereby maintained in its open position.

With the carrier arms 84 in the open position, the transport arm actuator 74 raises the carrier 80 vertically away from the seat 102 and the lever member 170. As the left carrier arm 84 is lifted, the engagement feature 176 is no longer displaced by the left carrier arm 84 and is permitted to move upward. As a result, the lever member 170 rotates in a direction opposite the direction D5. This release of the lever member 170 permits the spring 156 to force the pusher 130 to slide in a closing direction DC (FIG. 10) toward its closed position.

The return force of the spring 156 is applied to the labware 50 by the pusher 130. As the pusher 130 moves toward its closed position, the pusher 130 engages the proximate corner of the labware 50. As the pusher 130 continues to move toward its closed position, the force of the spring 156 causes the pusher 130 to align the labware 50 in the seat 102. More particularly, the spring-loaded pusher 130 displaces the labware into an alignment with the seat 102.

Although the displacement of the pusher 130 is in direction DC, the biased bearing face 136A distributes the force on the labware 50 both forwardly (direction DF1; FIG. 10) and laterally (direction DF2) toward the corner seat 117. The corner and sides of the labware 50 furthest from the pusher 130 are thereby pushed up against and loaded against the stops 116A-C.

As shown in FIG. 11, the illustrated pusher 130 travels a distance L3 in the direction DC until it assumes a fixing position, wherein the pusher 130 is prevented by the labware 50 from travelling further. In the fixing position (FIGS. 10 and 11), the lever member 170 is partially returned toward its upright, ready position. The return travel distance L3 is less than the opening travel distance L2 (FIG. 7). The distance between the pusher 130 and the seat rear end 102B (FIG. 10) in the fixing position is less than the distance between the pusher 130 and the seat rear end 102B in the open position, but greater than the distance between the pusher 130 and the seat rear end 102B in the closed position.

The spring-loaded pusher 130 clamps the labware 50 between the pusher 130 and the stops 116A-C. In this manner, the labware 50 is forcibly aligned in, positioned in and registered with the holder 100 and the seat 102. The labware 50 is captured between the bearing face 136A (FIG. 10) of the pusher 130 and the stops 116A-C. In some embodiments, the spring 156 remains stretched in the fixing position so that it continues to apply a load to the labware 50 via the pusher 130, thereby fixing the labware in position in the seat 102.

The labware 50 may then be operated on by the system 10 while secured in the holder 100. In some embodiments, the system 10 uses the pipetting module 40 to execute an operation while the labware is fixed in the seat 102.

In some embodiments, the pipetting module 40 is used to execute a pipette tip loading operation while the labware 50 is fixed in the seat 102. For example, in some embodiments, the pipetting module positioner 49 moves the pipetting module 40 into vertical alignment or registry with the labware 50 as shown in FIG. 11. The pipettor actuators 49A then lower the pipettor distal end portions 46 into respective ones of the coupling bases 62 of the pipette tips 60. The pipette tips 60 are thereby secured to the pipettor distal end portions 46. The pipettor actuators 49A then raise the pipettors 44 to remove the secured pipette tips 60 from the slots 57. In FIG. 11: the leftmost pipettor 44-1 is shown raised after insertion into its pipette tip 60, with the pipette tip 60 installed on the pipettor's 44-1 distal end portion 46 and ready for use; the next adjacent pipettor 44-2 is shown lowered into a pipette tip 60 that is still seated in its slot 57; and the remaining pipettors 44 are shown in their raised positions without having retrieved a pipette tip 60.

The pipettors 44 with the pipette tips 60 installed thereon can thereafter be used to execute further operations. Such further operations may include aspirating and/or dispensing liquid through the pipette tips 60 using the liquid handler 30 (e.g., as described below).

The illustrated ejector mechanisms 47 of FIG. 11 can thereafter be used to eject the pipette tips 60 from the pipettors 44. For example, the pipetting module positioner 49 (FIG. 1) may again move the pipetting module 40 into vertical alignment or registry with the labware 50 as shown in FIG. 11. With the pipetting module 40 so aligned, the ejector mechanisms 47 can push the pipette tips 60 off the pipettors 44 and into respective ones of the slots 57.

In further embodiments, the labware 50 may be provided with empty slots 57 (i.e., slots 57 without pipette tips 60 disposed therein) and installed in the holder seat 102 as described herein. Then, the pipetting module positioner 49 and the ejector mechanisms 47 can be used to deposit pipette tips 60 (that were otherwise installed on the pipettors 44) in the slots 57. For example, the labware 50 may be an empty tray that is used to collect used pipette tips 60 to be discarded.

When it is thereafter desired to remove the labware 50 from the holder 100, the carrier 80 may be positioned by the transport arm actuator 74 (FIG. 1) over the seat 102 and generally in alignment with the seat 102 (e.g., as shown in FIG. 2). If the carrier arms 84 are not already in their open position, the carrier actuator 83 (FIG. 3) places the arms 84 in the open position. The transport arm 72 is then driven by the transport arm actuator 74 to lower the carrier 80 (in direction D4) toward the seat 102. As the carrier 80 is lowered, the left arm 84 contacts the outer section 176B (FIG. 6) of the lever arm engagement feature 176. As the transport arm actuator 74 further moves the carrier 80 downward, the arm 84 applies a downward vertical force to the engagement feature 176. In the illustrated embodiments, this force causes the lever member 170 to rotate about the pivot axis Q-Q in direction D5 and push the pusher 130 in the opening direction DO against the return force of the spring 156, as described above. In such an embodiment, the labware 50 is thereby released (i.e., no longer clamped between the pusher 130 and the stops 116A-C). The transport arm actuator 74 lowers the carrier 80 into the seat until the pusher 130 is displaced into the fully open position (FIG. 7) and carrier support tabs 86 are aligned with the labware grooves 55.

The actuator 83 then displaces the arms 84 inwardly into the gripping position. In doing so, the left arm 84 slides inwardly (direction DG, FIG. 3) along the lever member surface of the engagement feature 176 from the outer section 176B to the inner section 176A. The support tabs 86 are thereby inserted into the labware grooves 55 and the labware 50 is thereby gripped by the carrier 80. The vertical position of the left arm 84 remains the same during this transition so that the position of the lever member 170 is not changed and the pusher 130 is thereby maintained in its open position.

With the carrier arms 84 gripping the labware 50 and the pusher 130 in the open position, the transport arm actuator 74 raises the carrier 80 (and the labware 50) vertically away from the seat 102 and the lever member 170. As the left carrier arm 84 is lifted, the engagement feature 176 is permitted to move upward and the lever member 170 rotates in a direction opposite the direction D5 (FIG. 7). This permits the spring 156 to force the pusher 130 to slide in the closing direction DC (FIG. 10). Because the labware 50 has been removed from the seat, in the illustrated embodiment, the pusher 130 is permitted to return to its fully closed position (FIG. 2). The labware 50 can then be transported to another location by the carrier 80.

A photosensor 178B (FIG. 8) of the detection system 178 may be monitored by the controller 20 (FIG. 1) and the output of the photosensor used by the controller 20 to determine whether the holder 100 (FIG. 1) is occupied (i.e., whether a labware is present or not present). For example, a photoemitter 178A (FIG. 8) directs a light beam to the photosensor 178B to form a light barrier across the slot 179. When the pusher 130 is in the closed position, the detection tab 144 will be disposed in the slot 179 and will occlude the light from the photoemitter 178A to the photosensor 178B, thereby indicating to the controller 20 that the seat is empty. When a labware 50 is fixed in the seat 102, the width of the labware 50 holds the pusher 130 in a fixing position wherein the detection tab 144 is withdrawn from the slot 179. In this case, the detection tab 144 does not occlude the light from the photoemitter 178A to the photosensor 178B, thereby indicating to the controller 20 that the seat is occupied.

Thus, it will be appreciated that the pusher actuator linkage 160 is configured to move the pusher 130 from its closed position (FIGS. 2 and 3) to an open position (FIG. 7) when the pusher actuator linkage 160 is displaced by an operator (e.g., by the carrier 80 or manually). The pusher actuator linkage 160 is also configured to permit the pusher 130 to move back from the open position toward the closed position when the pusher actuator linkage 160 is no longer displaced by an operator. The spring 156 is operative to force the pusher 130 toward the closed position when the pusher actuator linkage 160 is not displaced by the operator and to thereby cause the pusher 130 to align the labware 50 in the seat 102. When the labware 50 is positioned in the seat 102 and the pusher actuator linkage 160 permits the pusher 130 to move from the open position toward the closed position, the pusher 130 displaces the labware into an alignment with the seat 102 (e.g., as shown in FIG. 10).

Figure 12:
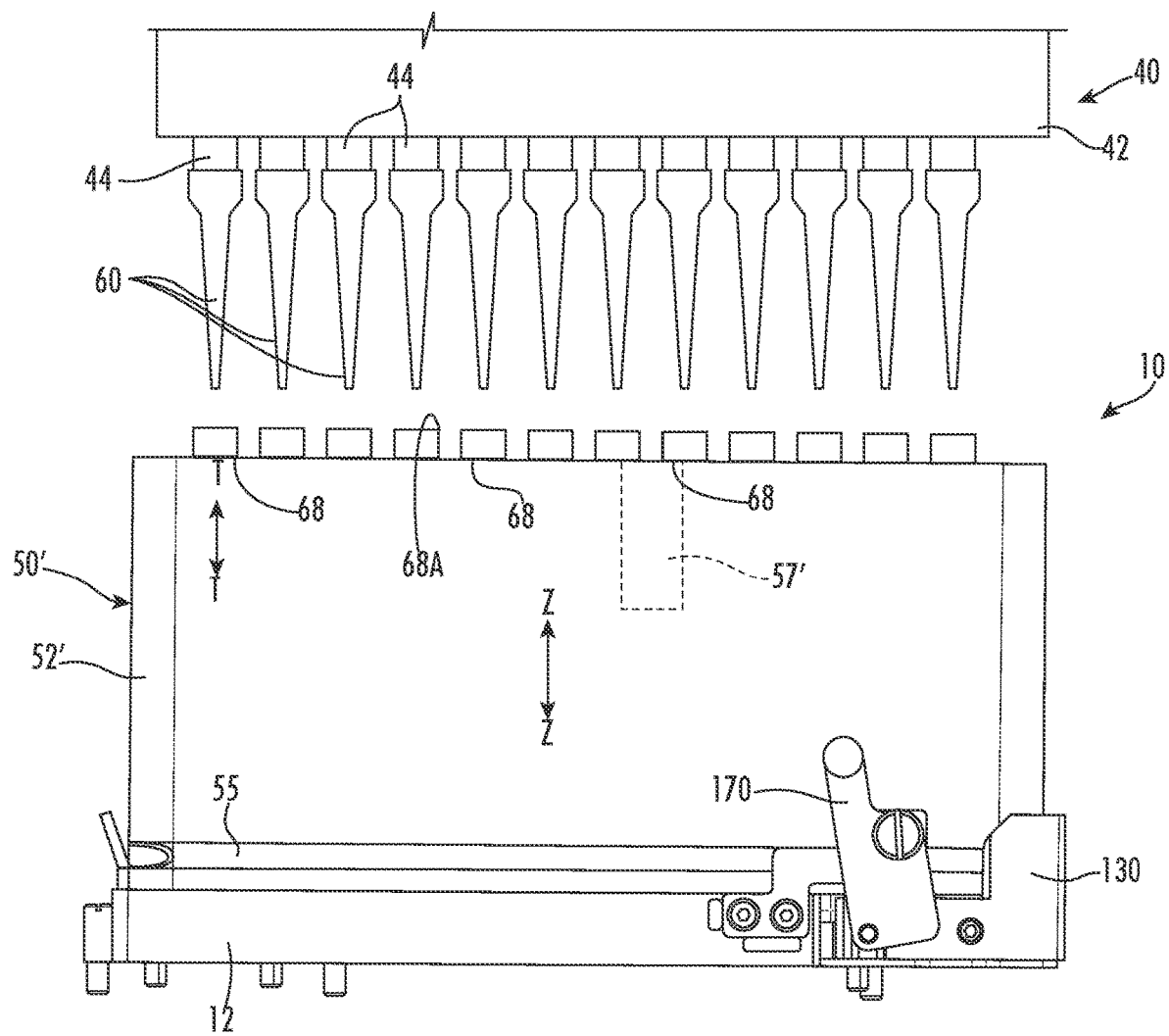
FIG. 12 is a fragmentary, side view of a laboratory liquid handling system according to FIG. 1, wherein an alternative labware is seated in a labware holder and pipettors are aligned with vials in a labware seated in the labware holder of FIG. 4.

With reference to FIG. 12, in still further embodiments the labware 50 may be replaced with an alternative labware 50'. The labware 50' may be constructed and used in the same manner as the labware 50, except as follows.

The labware 50' includes a platter 52' corresponding to the platter 52 and having slots 57' corresponding to the slots 57. The labware 50' also includes vials or other vessels or receptacles 68 configured to hold one or more liquid samples to be operated on by the system 10. The vials 68 are each removably seated in a respective one of the slots 57' in place of pipette tips 60. Each vial 68 has an opening at its proximal end 68A and facing upward.

The pipettors 44 may have pipette tips 60 mounted thereon. The pipetting module positioner 49 (FIG. 1) moves the FIG. 12 pipetting module 40 into vertical alignment or registry with the labware 50' as shown in FIG. 12. The pipettor actuators 49A (FIG. 1) then lower the pipettor tips 60 into respective ones of the vials 68.

In some embodiments, the system 10 then aspirates liquid from vials 68 into the inserted pipettors 44. In some embodiments, the system 10 then dispenses liquid into the vials 68 from the inserted pipettors 44.

The aspirating and/or dispensing can be enabled using the liquid handler 30. For example, in some embodiments, the liquid handler 30 generates a vacuum to aspirate a volume of liquid from each vial 68 into the corresponding pipettor 44. The aspirated liquid may be transferred through the tubing 30A to another device such as the analytical instrument 16, or may be subsequently dispensed from the pipettor 44. In some embodiments, a volume of liquid is supplied to the pipettors 44 from the liquid handler 30 through the tubing 30A and dispensed into the vials 68 from the pipettors 44.

By way of further example, the labware 50' may be or include a well plate or microwell plate including integral recesses or receptacles to contain liquid samples. In this case, the liquid samples are dispensed directly into or aspirated directly from the slots 57', which do not contain separate vials.

The foregoing examples are not exhaustive, and the system 10 may perform any suitable operations on the secured labware 50, 50' or other suitable labware.

Operations described herein can be executed by or through the controller 20. The actuators 49, 49A, 74, 83 and other devices of the system 10 can be electronically controlled. According to some embodiments, the controller 20 programmatically executes some, and in some embodiments all, of the steps described. According to some embodiments, the movements of the actuators 49, 49A, 74, 83 are fully automatically and programmatically executed by the controller 20. The controller 20 may be provided with an HMI 22 to receive user commands.

In some embodiments, the controller 20 automatically and programmatically executes the steps of gripping the labware 50, 50' with the carrier 80, transporting the labware 50, 50' in the carrier 80 to the holder 100, and placing the labware 50, 50' into the seat 102 (including opening the pusher 130 via the linkage 160 as described above).

In some embodiments, the controller 20 automatically and programmatically executes the steps of positioning the pipetting module 40 over the labware 50, 50' installed in the holder 100, inserting the pipettors 44 into the pipette tips 60 or the vials 68. In some embodiments, the controller 20 also automatically and programmatically executes the step of aspirating liquid from the vials 68 or dispensing liquid into the vials 68 as described above.

In some embodiments, the controller 20 automatically and programmatically executes the steps of inserting the carrier 80 into the seat 102 (including opening the pusher 130 via the linkage 160 as described above), gripping the labware 50, 50' with the carrier 80 in the seat 102, lifting the labware 50, 50' out of the holder 100, and transporting the labware 50, 50' in the carrier 80 away from the holder 100.

In some embodiments, the labware 50, 50' is manually placed in and/or removed from the holder 100 rather than using the carrier 80 or another robotic mechanism. This may be accomplished using either of two techniques. The labware 50 is referred to below; however, it will be appreciated that this discussion likewise applies to other labware (e.g., the labware 50').

According to a first technique, the operator (i.e., a human user) presses down (direction D4; FIG. 7) and/or sideways (direction D5; FIG. 7) on the upper leg 172 of the lever member 170 to thereby force the pusher 130 into its open position. The operator may press or displace the lever member 170 in this manner manually using the operator's finger or hand directly, or indirectly, using a handheld tool, for example. The operator or user then places the labware 50 on the base support surface 114 in the seat 102 while maintaining the lever member 170 in the open position. Once the labware 50 is placed or positioned in the seat 102, the operator manually releases the lever member 170, which allows the pusher 130 (under the force of the spring 156) to retract and positively position the labware 50 in the seat in the same manner as described herein.

According to another technique, the human operator manually places or presses the labware 50 into the seat 102 without pressing the lever member 170. In this case, a corner of the labware 50 contacts the sloped face 136B (FIG. 5) of the pusher 130. The vertically downwardly directed load from the labware 50 is redirected by the sloped face 136B and forces the pusher 130 to slide outward (direction DO) against the return force of the spring 156 until the labware 50 clears the lower edge of the sloped face 136B. When the labware 50 is seated on the support surface 114 and released by the operator, the pusher 130 (under the force of the spring 156) will positively position the labware 50 in the seat in the same manner as described above.

The labware 50 can be removed from the holder 100 by simply lifting the labware by hand out of the seat 102, thereby permitting the pusher 130 to return to its closed position. If desired, the lever member 170 (FIG. 7) can be pressed by hand to force the pusher 130 away from the labware 50 before lifting, in order to ease removal.

In a system including a transport system, such as the transport system 70, labware may be loaded into and/or removed from the holder 100 both robotically and by hand.

According to further embodiments, the holder 100 can be used in a system, apparatus or procedure that does not include or employ a transport system or carrier. In this case, the labware may be installed in and removed from the holder solely by hand.

In embodiments, the holder 100 and the kinematic, spring-loaded fixation mechanism 131 can provide a number of benefits and advantages. For example, the holder 100 enables precise labware placement and positioning. Precise positioning of the labware may be important, and even critical, for successive operations such as taking pipette tips 60 or pipetting from the receptacles 68 using automatically positioned pipettors 44. High positioning accuracy may be required for pipettors to enable accurate registry between the pipettors 44 and the pipette tips 60 or the receptacles 68. Such precise alignment also enables precise transfer back to a carrier when it is desired to remove the labware from the holder 100.

By pushing the pusher 130 far out from the seat 102, the holder 100 provides increased tolerance for initially placing the labware in the seat 102. Nonetheless, as a result of the disclosed positioning systems and methods, the labware is thereafter precisely aligned after the labware is initially placed in the seat 102. In embodiments, the labware is free of external forces during transfer into and out of the holder 100, and is locked in the holder 100 when the carrier 80 moves out. Therefore, the risk of tilting or tipping the labware 50, 50' during transfer may also be reduced or eliminated. Displacing the pusher 130 far out allows for imprecise or rough alignment between the labware and the seat 102 during initial placement.

The spring-loaded fixation mechanism can enable insertion and effective fixation of labware of different sizes in a given holder 100 without requiring adjustments by the operator.

The spring-loaded fixation mechanism 131 is passive and its operation is not electronic. The illustrated fixation mechanism 131 does not include or require a separate active actuator, sensor or switch to open and close the positioning mechanism. As a result, it is not necessary to coordinate the action or timing of actuation of a holder actuator with the movement of the carrier 80 or the labware 50, 50'. The holder 100 may not depend on precise positioning of the carrier or precise manipulation of the holder 100 by the robot or manual operator. It is not necessary to alter the robot, its end effector, or its typical movement path in order to operate the fixation mechanism 131.

The labware holder 100 can accommodate labware that is gripped at or near its midsection. When the holder 100 is loaded using a robotic carrier, the fixation mechanism 131 is operated without loading the labware 50, 50' until the labware is released by the carrier. The carrier grip force is not limiting because spring force is not applied to the labware while the labware is gripped. Therefore, the carrier can hold the labware with little or limited gripping force. The fixation mechanism 131 can be designed to use an amount of spring force on the pusher optimizes fixation without concern about compromising the grip of the carrier on the labware.

The precise, consistent, and repeatable positioning of the labware in the holder 100 can ensure proper matching between the X-Y orientations of the holder 100, the labware 50, 50', and the pipettors 44.

Systems and holders according to embodiments of the technology can be used in biochemical and chemical processing, liquid handling, and analysis of samples in laboratories, for example. The analytical instrument 16 may be any suitable apparatus or instrument.

Embodiments of the controller 20 logic may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, controller logic may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices.

Figure 13:
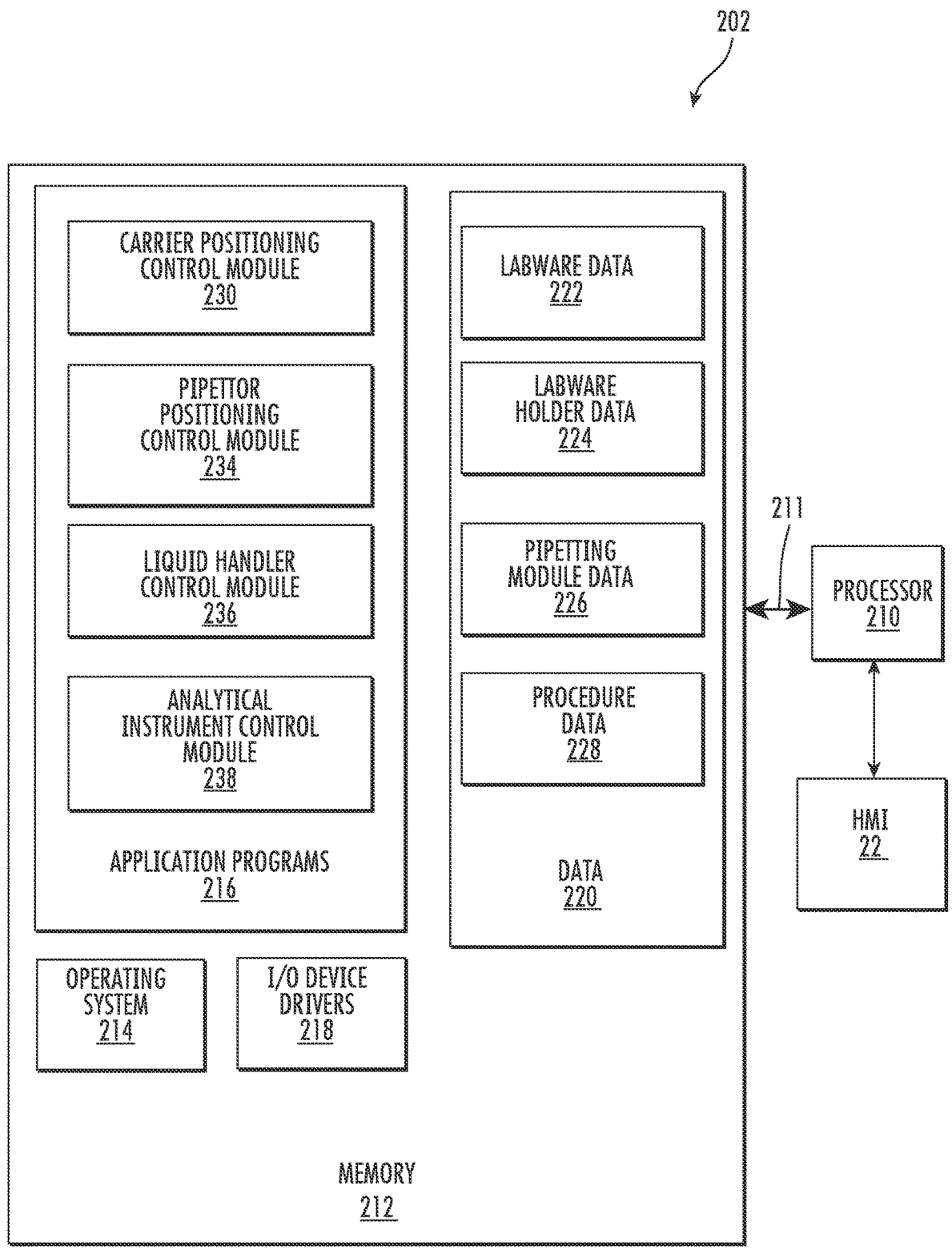
FIG. 13 is a schematic diagram representing a controller forming a part of a laboratory liquid handling system, such as a system according to FIG. 1.

FIG. 13 is a schematic illustration of a circuit or data processing system 202 that can be used in the controller 20. The circuits and/or data processing systems may be incorporated in a digital signal processor 210 in any suitable device or devices. The processor 210 communicates with the HMI 22 and memory 212 via an address/data bus 211. The processor 210 can be any commercially available or custom microprocessor. The memory 212 is representative of the overall hierarchy of memory devices containing the software and data used to implement the functionality of the data processing system. The memory 212 can include, but is not limited to, the following types of devices: cache, ROM, PROM, EPROM, EEPROM, flash memory, SRAM, and DRAM.

FIG. 13 illustrates that the memory 212 may include several categories of software and data used in the data processing system: the operating system 214; the application programs 216; the input/output (I/O) device drivers 218; and data 220.

The data 220 can include equipment-specific data. FIG. 13 also illustrates that the data 220 can include labware data 222, labware holder data 224, pipetting module data 226, and procedure data 228.

The labware data 222 can include data relating to or representing characteristics of the labware 50, 50'. This data may include, for example, a unique identifier (e.g., serial number) and/or name for the labware 50, 50' name for the labware 50, 50', a unique identifier and/or name for the pipette tips 60, a unique identifier and/or name for each vial 68, and/or description of an analyte or analytes contained in the labware 50, 50' or each vial 68 or slot/receptacle 57. The labware data 222 can include dimensions of the labware 50, 50', the pipette tips 60, the vials 68, and/or the slots or receptacles 57. The labware data 222 can include location data representing spatial or geometric layout or positions of the slots 57, the pipette tips 60, or the vials 68 relative to the outer boundaries of the labware 50, 50'.

The labware holder data 224 can include identification of the location of the seat 102 relative to the deck 12 or another reference structure of the system 10.

The pipetting module data 226 can include pipettor location data representing spatial or geometric layout or positions of the pipettors 44 relative to the base 42.

The procedure data 228 can include data representing a protocol or sequence of steps to execute the procedures described herein. The sequence of steps may include all or some of the steps described above as executed by the controller 20. The sequence of steps may include an analytical sequence, for example.

FIG. 13 also illustrates that application programs 216 can include a carrier positioning control module 230 (to control the actuators 74, 83), a pipettor positioning control module 234 (to control the actuators 49, 49A), and a liquid handler control module 236 to control the liquid handler 30, and an analytical instrument control module 238 to control operation of the analytical instrument 16.

As will be appreciated by those of skill in the art, the operating system 214 may be any operating system suitable for use with a data processing system. The I/O device drivers 218 typically include software routines accessed through the operating system 214 by the application programs 216 to communicate with devices such as I/O data port(s), data storage and certain memory components. The application programs 216 are illustrative of the programs that implement the various features of the data processing system and can include at least one application, which supports operations according to embodiments of the present technology. Finally, the data 220 represents the static and dynamic data used by the application programs 216, the operating system 214, the I/O device drivers 218, and other software programs that may reside in the memory 212.

As will be appreciated by those of skill in the art, other configurations may also be utilized while still benefiting from the teachings of the present technology. For example, one or more of the modules may be incorporated into the operating system, the I/O device drivers or other such logical division of the data processing system. Thus, the present technology should not be construed as limited to the configuration of FIG. 13, which is intended to encompass any configuration capable of carrying out the operations described herein. Further, one or more of the modules can communicate with or be incorporated totally or partially in other components, such as the controller 20.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A labware aligning system for use with a labware, the labware aligning system comprising:
   a frame comprising a seat; and
   a fixation system comprising:
      a pusher movable relative to the frame between an open position and a closed position; and,
      a pusher actuator comprising:
         an actuator linkage configured to:

move the pusher from the closed position toward the open position when the actuator linkage is displaced; and, permit the pusher to move toward the closed position when the actuator linkage is not displaced; and, a biasing mechanism operative to force the pusher toward the closed position when the actuator linkage is not displaced and to thereby cause the pusher to align the labware in the seat;

wherein:

the actuator linkage comprises an engagement member;

the engagement member is configured to be displaced by an operator to displace the actuator linkage to move the pusher from the closed position toward the open position;

the engagement member is mechanically linked to the pusher; and the actuator linkage is configured to redirect displacement of the engagement member by the operator in a vertical direction to translational movement of the pusher in a horizontal direction.

2. The labware aligning system of claim 1, wherein the biasing mechanism comprises a spring.

3. The labware aligning system of claim 1, wherein:
the frame comprises a barrier adjacent the seat and opposing the pusher; and
when the labware is positioned in the seat and the actuator linkage permits the pusher to move from the open position toward the closed position, the biasing mechanism forces the pusher to push the labware against the barrier.

4. The labware aligning system of claim 1, wherein, when the labware is positioned in the seat and the actuator linkage permits the pusher to move from the open position toward the closed position, the pusher displaces the labware into an alignment with the seat.

5. The labware aligning system of claim 1, wherein the pusher comprises a sloped bearing surface facing laterally inward toward the seat and upwardly away from the seat.

6. The labware aligning system of claim 1, wherein the actuator linkage is configured to permit the pusher to move from the open position toward the closed position when the operator releases the engagement member.

7. The labware aligning system of claim 1, wherein the actuator linkage comprises a guide feature that constrains movement of the pusher to linear translation along a pusher travel axis.

8. The labware aligning system of claim 1, further comprising a detector system operative to determine a position of the pusher.

9. The labware aligning system of claim 8, wherein:
the detector system comprises:
a photoemitter to generate a light beam; and
a photodetector configured to receive the light beam;
the pusher prevents the light beam from reaching the photodetector when the pusher is in the closed position; and
the pusher permits the light beam to reach the photodetector when the pusher is displaced by the labware in the seat.

10. The labware aligning system of claim 1, wherein the labware is at least one of a tip box, pipette tip box, a well plate, a microwell plate, and a rack configured to hold a plurality of fluid receptacles.

11. A labware handling system for use with a labware, the labware handling system comprising:

a transport system operable to move the labware, the transport system comprising a carrier configured to releasably hold the labware; and an aligning system comprising:
a frame comprising a seat; and
a fixation system comprising:
a pusher movable relative to the frame between an open position and a closed position; and,
a pusher actuator comprising:
an actuator linkage configured to:
move the pusher from the closed position toward the open position when the actuator linkage is displaced by the carrier; and,
permit the pusher to move toward the closed position when the actuator linkage is not displaced; and,
a biasing mechanism operative to force the pusher toward the closed position when the actuator linkage is not displaced and to thereby cause the pusher to align the labware in the seat;

wherein the transport system is configured to:
move the labware to the seat while holding the labware in the carrier;
using the carrier, displace the actuator linkage to move the pusher from the closed position toward the open position to receive the labware in the seat; and thereafter
deposit the labware in the seat with the pusher in the open position.

12. The labware handling system of claim 11, wherein:
the actuator linkage comprises an engagement member; and
the transport system is configured to contact the engagement member with the carrier such that the carrier displaces the engagement member as the carrier moves toward the seat to deposit the labware in the seat and thereby forces the pusher from the closed position toward the open position.

13. The labware handling system of claim 12, wherein:
the transport system is configured to move the carrier away from the seat after the transport system has deposited the labware in the seat; and
the actuator linkage is configured to permit the biasing mechanism to move the pusher from the open position toward the closed position in response to the carrier moving away from and releasing the engagement member.

14. The labware handling system of claim 12, wherein the engagement member is mechanically linked to the pusher.

15. The labware handling system of claim 14, wherein the actuator linkage is configured to redirect displacement of the engagement member by the carrier in a first direction to translational movement of the pusher in a second direction transverse to the first direction.

16. The labware handling system of claim 15, wherein the first direction is vertical, and the second direction is horizontal.

17. The labware handling system of claim 11, wherein:
the carrier comprises a gripper configured to hold the labware; and
the transport system is configured to:
move the labware to the seat while the gripper holds the labware;
place the labware in the seat while the gripper holds the labware;
open the gripper to release the labware from the gripper and deposit the labware in the seat; and move the gripper away from the seat after the gripper has deposited the labware in the seat.

18. The labware handling system of claim 11, wherein:
the carrier comprises a carrier arm, a support feature extending from the carrier arm, and a carrier actuator;
the support feature is configured to engage the labware to support the labware; and
the carrier actuator is operable to disengage the support feature from the labware to release the labware from the carrier and into the seat.

19. The labware handling system of claim 11, wherein the transport system comprises a robot arm and the carrier is an end effector on the robot arm.

20. The labware handling system of claim 11, further comprising at least one controller configured to automatically and programmatically operate the transport system to:
move the labware to the seat while holding the labware in the carrier;
using the carrier, displace the actuator linkage to move the pusher from the closed position toward the open position to receive the labware in the seat; and thereafter
deposit the labware in the seat with the pusher in the open position.

21. The labware handling system of claim 11, wherein:
the actuator linkage comprises an engagement member;
the transport system is configured to contact the engagement member with the carrier such that the carrier displaces the engagement member as the carrier moves toward the seat to deposit the labware in the seat and thereby forces the pusher from the closed position toward the open position;
the transport system is configured to move the carrier away from the seat after the carrier has deposited the labware in the seat;
the actuator linkage is configured to permit the pusher to move from the open position toward the closed position in response to the carrier moving away from and releasing the engagement member;
the engagement member is mechanically linked to the pusher;
the actuator linkage is configured to redirect displacement of the engagement member by the carrier in a first direction to translational movement of the pusher in a second direction transverse to the first direction;
the first direction is vertical, and the second direction is horizontal;
the carrier comprises a gripper configured to hold the labware;

the transport system is configured to:
move the labware to the seat while the gripper holds the labware;
place the labware in the seat while the gripper holds the labware;
open the gripper to release the labware from the gripper and deposit the labware in the seat;
move the gripper away from the seat after the gripper has deposited the labware in the seat; and
the labware handling system further includes a controller configured to automatically and programmatically operate the transport system to deposit the labware in the seat and remove the labware from the seat.

22. A liquid handling system for use with a labware, the liquid handling system comprising:
a labware handling system comprising:
a transport system operable to move the labware, the transport system comprising a carrier configured to releasably hold the labware; and
an aligning system comprising:
a frame comprising a seat; and
a fixation system comprising:
a pusher movable relative to the frame between an open position and a closed position; and,
a pusher actuator comprising:
an actuator linkage configured to:
move the pusher from the closed position toward the open position when the actuator linkage is displaced by the carrier; and,
permit the pusher to move toward the closed position when the actuator linkage is not displaced; and,
a biasing mechanism operative to force the pusher toward the closed position when the actuator linkage is not displaced and to thereby cause the pusher to align the labware in the seat;
wherein the transport system is configured to:
move the labware to the seat while holding the labware in the carrier;
using the carrier, displace the actuator linkage to move the pusher from the closed position toward the open position to receive the labware in the seat; and thereafter
deposit the labware in the seat with the pusher in the open position; and
a liquid handler.

* * * * *